(12) United States Patent
Krstic et al.

(10) Patent No.: US 10,063,557 B2
(45) Date of Patent: Aug. 28, 2018

(54) ACCOUNT ACCESS RECOVERY SYSTEM, METHOD AND APPARATUS

(71) Applicant: Apple Inc., Cupertino, CA (US)

(72) Inventors: Ivan Krstic, San Francisco, CA (US); James Wilson, San Jose, CA (US); Eric Daniel Friedman, Berkeley, CA (US); Selvarajan Subramaniam, Cupertino, CA (US); Patrice O. Gautier, San Francisco, CA (US); John Patrick Gates, San Francisco, CA (US); Ramarathnam Santhanagopal, Sunnyvale, CA (US); Prabhakaran Vaidyanathaswami, San Jose, CA (US); Sudhakar Mambakkam, San Jose, CA (US); Raghunandan Pai, Cupertino, CA (US); Karthik Narayanan, London (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/872,034

(22) Filed: Sep. 30, 2015

(65) Prior Publication Data
US 2016/0359837 A1 Dec. 8, 2016

Related U.S. Application Data

(60) Provisional application No. 62/172,199, filed on Jun. 7, 2015.

(51) Int. Cl.
*G06F 11/30* (2006.01)
*H04L 29/06* (2006.01)
(Continued)

(52) U.S. Cl.
CPC ........ *H04L 63/102* (2013.01); *G06F 12/1408* (2013.01); *G06F 21/42* (2013.01);
(Continued)

(58) Field of Classification Search
CPC . H04L 63/102; H04L 63/0807; H04L 63/083; H04L 63/0861; G06F 12/1408; G06F 2212/1052
See application file for complete search history.

(56) References Cited

U.S. PATENT DOCUMENTS

| 7,249,261 B2 | 7/2007 | Charbonneau |
| 7,849,307 B2 | 12/2010 | Roskind |

(Continued)

FOREIGN PATENT DOCUMENTS

WO PCT/US2016/036266     6/2016

OTHER PUBLICATIONS

International Search Report and Written Opinion of PCT/US2016/036266, Aug. 19, 2016 (mailing date), Apple Inc.
(Continued)

*Primary Examiner* — Techane Gergiso
(74) *Attorney, Agent, or Firm* — McDermott Will & Emery LLP

(57) ABSTRACT

Some embodiments of the invention provide a program for recovering access to an account. The program receives an access recovery parameter (ARP) after providing a first credential to log into an account and providing a notification of a second credential necessary for accessing another resource. The program then receives a request to modify the first credential and receives the second credential. Next, after authenticating the second credential, the program uses the ARP to modify the first credential without providing the first credential.

20 Claims, 17 Drawing Sheets

(51) Int. Cl.
  *G06F 12/14*  (2006.01)
  *G06F 21/42*  (2013.01)
  *G06F 21/45*  (2013.01)

(52) U.S. Cl.
  CPC ............ *G06F 21/45* (2013.01); *H04L 63/083* (2013.01); *H04L 63/0807* (2013.01); *G06F 2212/1052* (2013.01); *G06F 2221/2131* (2013.01); *H04L 63/0861* (2013.01)

(56) References Cited

U.S. PATENT DOCUMENTS

| | | | |
|---|---|---|---|
| 8,099,765 B2 | 1/2012 | Parkinson et al. | |
| 8,296,570 B2 | 10/2012 | Hamid et al. | |
| 8,359,273 B2 | 1/2013 | Leleu | |
| 8,850,524 B2 | 9/2014 | Morris et al. | |
| 9,053,310 B2 | 6/2015 | Oberheide et al. | |
| 9,641,505 B2 | 5/2017 | Neuman et al. | |
| 9,942,756 B2 | 4/2018 | Conant et al. | |
| 2005/0003801 A1 | 1/2005 | Randall et al. | |
| 2006/0156210 A1* | 7/2006 | Ranson | G06F 11/203 714/799 |
| 2007/0255943 A1* | 11/2007 | Kern | H04L 9/0894 713/155 |
| 2009/0320117 A1 | 12/2009 | Liu et al. | |
| 2010/0293600 A1* | 11/2010 | Schechter | G06F 21/31 726/4 |
| 2010/0306821 A1 | 12/2010 | Cathcart et al. | |
| 2011/0072274 A1 | 3/2011 | Leoutsarakos et al. | |
| 2011/0106709 A1* | 5/2011 | Puura | G06Q 20/20 705/64 |
| 2011/0239283 A1 | 9/2011 | Chern | |
| 2012/0110318 A1 | 5/2012 | Stone | |
| 2013/0036455 A1 | 2/2013 | Bodi et al. | |
| 2013/0086645 A1 | 4/2013 | Srinivasan et al. | |
| 2013/0145148 A1* | 6/2013 | Shablygin | H04L 63/0853 713/155 |
| 2013/0159699 A1 | 6/2013 | Torkkel | |
| 2013/0198824 A1* | 8/2013 | Hitchcock | G06F 21/00 726/6 |
| 2014/0053251 A1* | 2/2014 | Chen | H04L 63/08 726/6 |
| 2014/0075513 A1 | 3/2014 | Trammel et al. | |
| 2014/0109206 A1 | 4/2014 | Goel et al. | |
| 2014/0156989 A1* | 6/2014 | Lalwani | H04L 9/0894 713/155 |
| 2014/0282881 A1 | 9/2014 | Li et al. | |
| 2014/0282969 A1* | 9/2014 | Ye | G06F 21/45 726/7 |
| 2014/0304324 A1 | 10/2014 | Hirata | |
| 2014/0337955 A1 | 11/2014 | Mendelovich et al. | |
| 2015/0046989 A1 | 2/2015 | Oberheide et al. | |
| 2015/0067804 A1 | 3/2015 | Maxwell | |
| 2015/0089569 A1 | 3/2015 | Sondhi et al. | |
| 2016/0330206 A1 | 11/2016 | Xu | |

OTHER PUBLICATIONS

Author Unknown, "Using Account Recovery", LastPass User Manual, Jun. 23, 2015, 5 pages, available at https://web.archive.org/web/20150623004207/http://helpdesk.lastpass.com/account-recovery/.

* cited by examiner

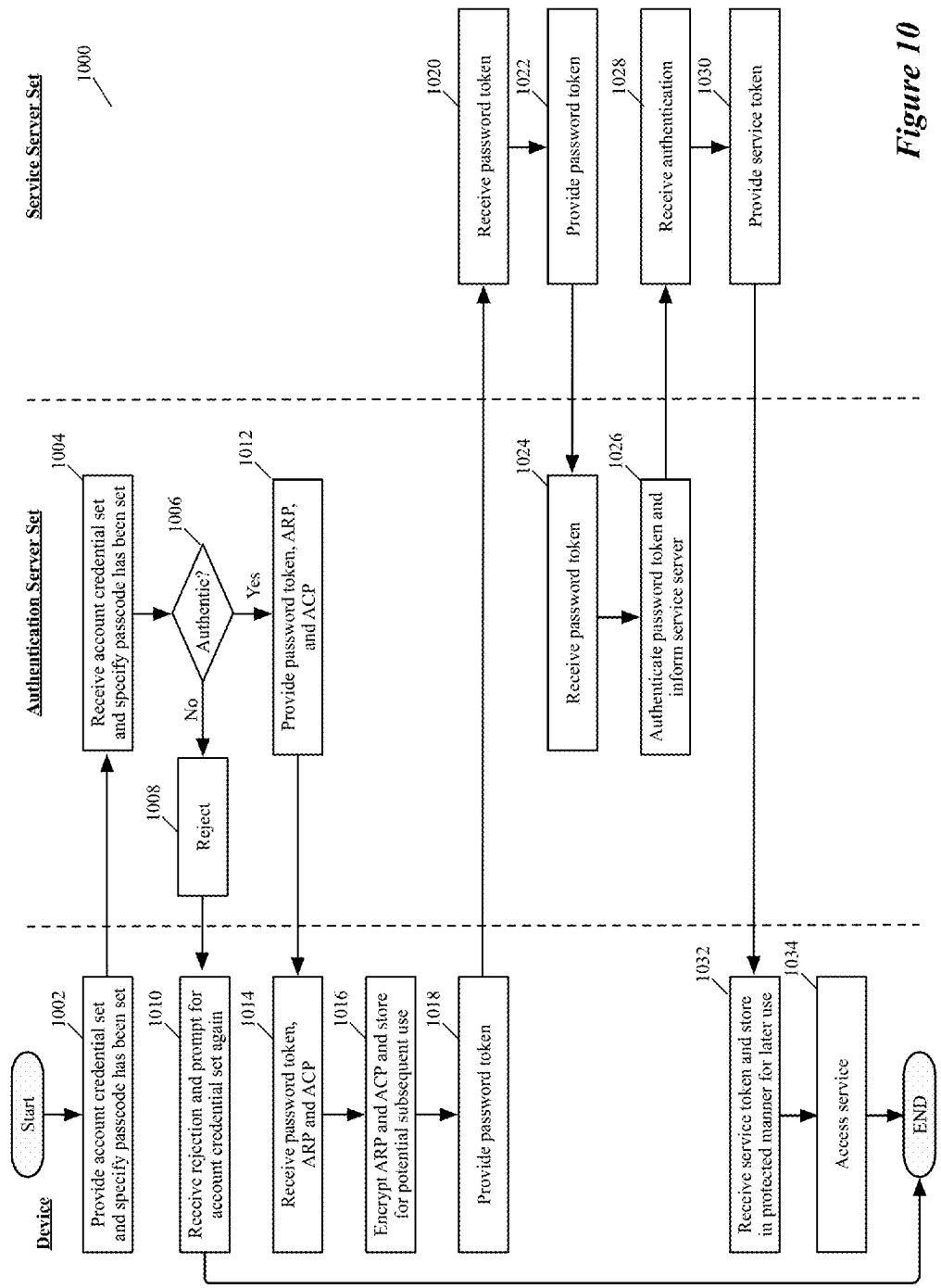

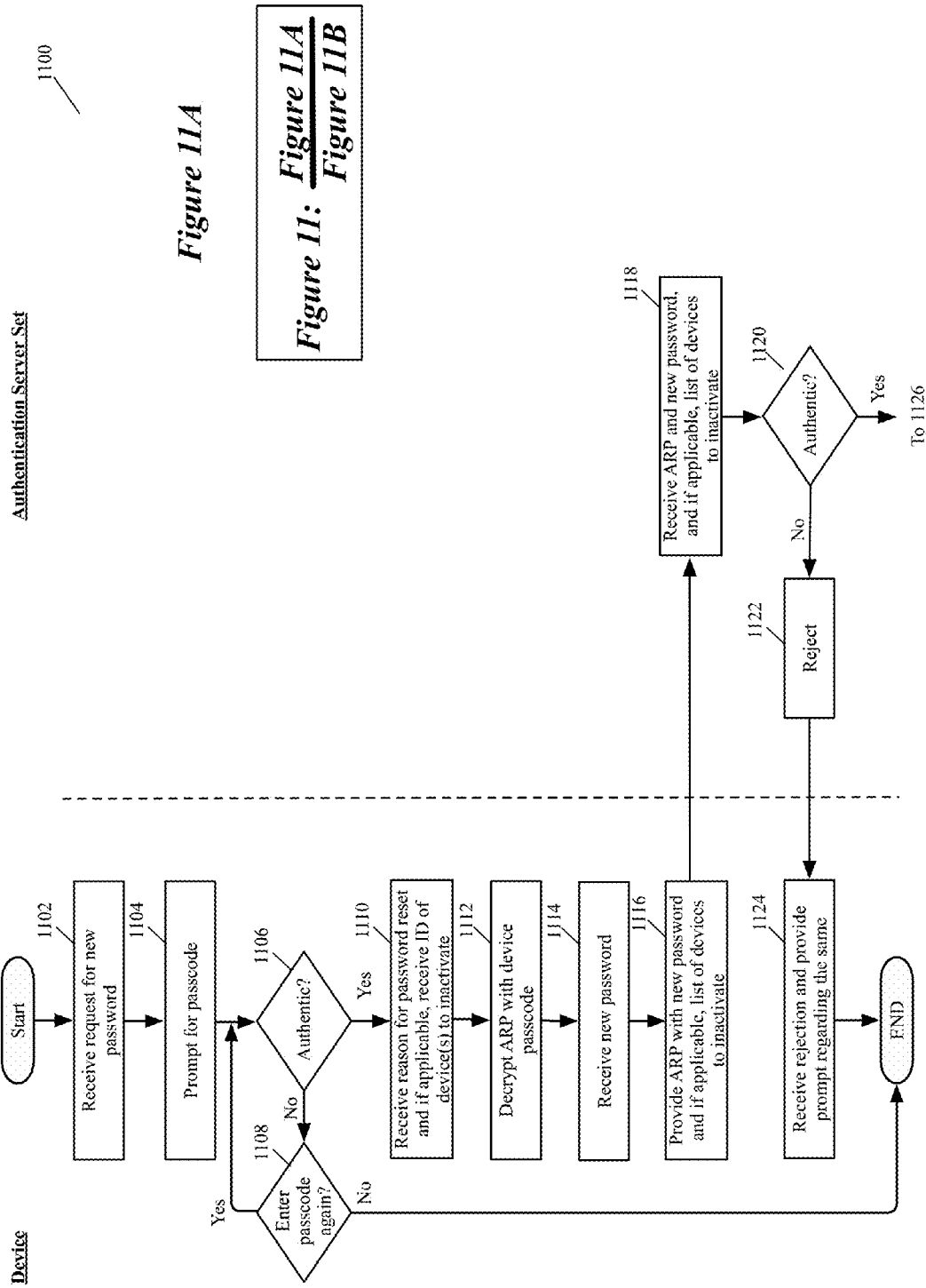

ACCOUNT ACCESS RECOVERY SYSTEM, METHOD AND APPARATUS

BACKGROUND

Today, most users of computing devices have multiple accounts that require the user to provide one or more credentials to gain access to them. Because of this, it is quite common for one person to have multiple passwords for multiple different accounts. With the increasing number of passwords, users typically forget the passwords that they use for their different accounts. Also, with the proliferation of devices that can be associated with one account, a user often has to supply passwords on multiple devices associated with an account whenever the user changes his account password.

To date, there has not been many solutions that provide a simple, but yet robust account-recovery scheme that allows a user to quickly regain access to an account, while providing strong account protection. Ideally, the account recovery scheme should not disrupt service access on multiple devices of the user when the user modifies the account password.

SUMMARY

Some embodiments of the invention provide a novel account-access recovery method. In some embodiments, this method is implemented by a set of one or more servers that manages several accounts. Also, for the account, one or more servers in some embodiments provide one or more services, such as data-storage services, data-access services, email services, data synchronization services, etc.

To gain access to a service associated with an account, the device initially provides a first set of credentials to the server set that manages the accounts. The server set authenticates the first credential set and gives the device access to the service after authenticating the first credential set. The server set also determines whether the device requires a second set of one or more credentials from a user in order to provide access (1) to the device, (2) to content stored on the device, and/or (3) to another account/service accessible through the device.

For instance, in some embodiments, the second credential set is a passcode or gesture that is used to gain access to the device. If the device requires the second credential set, the server set provides an access recovery parameter (ARP) to the device after the device successfully gains access to the account by providing the first credential set. In some embodiments, the device encrypts the ARP by using the second credential set and stores the encrypted ARP (e.g., locally on the device).

Subsequently, the device can use the ARP to re-gain access to the account. For instance, in some embodiments, the device can use the ARP to change at least a portion of the first credential set (e.g., to change the account password) without providing the complete first credential set (e.g., without providing the account password). To do this, the device in some embodiments (1) obtains the second credential set from the user, (2) authenticates the second credential set, and (3) after authenticating the second credential set, provides the ARP to a set of servers that allow the device to change at least part of the first credential set. In some embodiments, the device uses the second credential set to decrypt the encrypted ARP, before sending the ARP to the server set. In some embodiments, the server set that receives the ARP from the device is the same server set that provided the ARP to the device in the first instance. In other embodiments, the two server sets are different.

The server set that receives the ARP from the device allows the device to change at least part of the first credential set because the ARP verifies that the device has the authority to change the account's first credential set without providing this credential set. As mentioned above, the second credential set in some embodiments is a set of credentials that is needed to access the device. For instance, the second credential set is a passcode or unique gesture that is needed to unlock the device. Accordingly, the credential-recovery method of these embodiments allows a user of a device to change the credential set for accessing an account so long as the user remembers passcode or unique gesture that is needed for unlocking the device. In some embodiments, the passcode or gesture have to satisfy a threshold level of complexity before the device is deemed to have an acceptable second credential set for it to receive the ARP.

When the server set provides the device with the ARP, the server set in some embodiments also provides an access continuation parameter (ACP) to the device. Even after the first credential set changes, the ACP allows the device to continue accessing the account without having the device provide the changed first credential set to the server set. In addition the ARP and ACP, the server set provides in some embodiments a token to the device after the device provides the first credential set to the server set to gain access to the account. For subsequent accesses to the account, the device can provide the token to the server set so that it does not have to ask the user for the first credential set and it does not have to store the first credential set locally on its storage.

In some of these embodiments, multiple devices can be given access to the same account when they each provide the requisite first credential set. Each such device is given an ACP and a token for accessing the account when the device provides the first credential set. When one of these devices is lost, inactive, or otherwise compromised, or a user sees suspicious activity on his/her account, the server set allows the user to change the first credential set (e.g., to change the password). In this situation, the server set also (1) makes all the tokens that it handed to all the devices inactive and (2) makes the ACP of any lost, inactive, or compromised device invalid.

Subsequently, when a device tries to access the account by using its token, the server set rejects the token and directs the device to provide its ACP. Once the device provides its ACP, the server set then checks the ACP to make sure that it is a valid one (e.g., to make sure that the provided ACP is on a list of valid ACPs for the account). If the provided ACP is valid, the server set provides another token to the device in some embodiments. The device can then use this token for subsequent accesses to the account. In this manner, this device does not need to provide the changed first credential set to the server set to gain access to the account, because it can provide the ACP as a substitute credential in place of the modified first credential set.

In some embodiments, the server set does not invalidate previously provided ACP(s) when the user indicates that he/she wants to change the first credential set (e.g., the account password) to maintain credential hygiene or to obtain a new credential because the user has forgotten the old credential. For instance, in some embodiments, the server set and the devices implement an intent-based credential reset method that only revokes an ACP for credential resets that are associated with lost, inactive, or compromised devices, or to address suspicious account activity.

In some embodiments, the intent-based credential reset method prompts the user to specify the reason for the requested change to the account credential. When the user specifies the reason for the credential reset is a lost, inactive, or compromised device, the method provides a prompt that asks the user to identify (1) any device that should be maintained as an active device for the account, (2) any device that should be made inactive for the account, or (3) both active and inactive devices for the account. Based on the user's input, the method then deletes or makes otherwise inactive the ACP of any inactive device, while maintaining the active status of the ACP of any device that is still active.

In some embodiments, the server set includes different subsets of servers that provide service access tokens, ARPs, and ACPs. For instance, some embodiments use (1) a set of one or more authentication servers for allowing devices to log into different accounts, and (2) several sets of service servers that allow the devices to access several services after logging into their respective accounts. Each service server set can have just one server or can have more than one servers.

To log into an account, each device obtains from a user the account login credentials and forwards them to the authentication server set in some embodiments The login credentials in some embodiments not only include username and password, but also include a second factor authentication parameter that is needed to authenticate the user. Examples of such second factor authentication parameters include alphanumeric characters that are either emailed to the user, texted to the user, or displayed on another user device associated with the account. As part of the login credentials for an account, the user in some embodiments needs to provide such a second factor authentication parameter along with a username and password (e.g., after providing the username and password). In some embodiments, the user first provides the username and password to the server set and then goes through a second factor authentication process that is initiated by the server set (e.g., after the server set authenticates the username and password) in order to provide the second factor authentication parameter.

After receiving the login credentials, the authentication server set then authenticates the login credentials and provides an ACP and a password token to the device. The device supplies the password token to a service server set to gain access to the service that is provided by that service server set. As further described below, the service server set authenticates the supplied password token with the authentication server set, and then provides a service token to the device so that the device can use this token for subsequent accesses to the service server set.

In addition to the ACP and password token, the authentication server set can also provide an ARP to a device that provides the account credentials. For example, in some embodiments, the device informs the authentication server set that access to the device is restricted by a passcode or gesture that meets a threshold criteria. Because the device access is so restricted, the authentication then provides the ARP to the device. The device can then subsequently use the ARP to modify the account credential set.

In other embodiments, the devices, service server sets and authentication server set interact differently. For instance, in some embodiments, the devices interact only with the service server sets and it is the job of the service server sets to interact with the authentication server set to authenticate login credentials, ARPs and ACPs provided by the device.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

FIG. 10 illustrates a process for initially logging a device into a service server set.

FIGS. 11A and 11B illustrate a process for using an access recovery parameter (ARP) to modify account login credentials.

DETAILED DESCRIPTION

Figure 1:
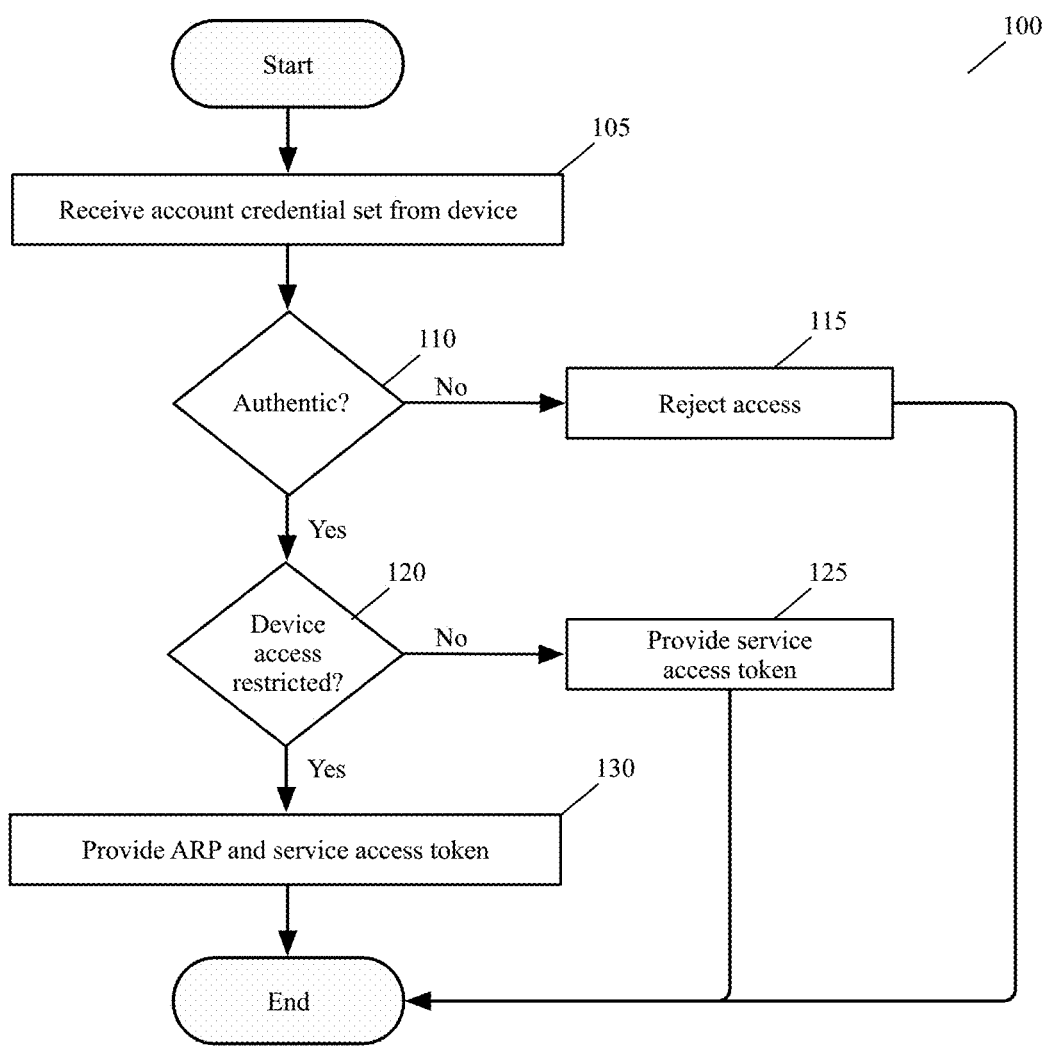
FIG. 1 conceptually illustrates a credential reset process of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel account-access recovery method. In some embodiments, this method is implemented by a set of one or more servers that manages several accounts. Also, for the account, one or more servers in some embodiments provide one or more services, such as data-storage services, data-access services, email services, data synchronization services, etc.

To gain access to a service associated with an account, the device initially provides a first set of credentials to the server set that manages the accounts. The server set authenticates the first credential set and gives the device access to the service after authenticating the first credential set. The server set also determines whether the device requires a second set of one or more credentials from a user in order to provide access (1) to the device, (2) to content stored on the device, and/or (3) to another account/service accessible through the device.

For instance, in some embodiments, the second credential set is a passcode or gesture that is used to gain access to the device. As further described above and below, other embodiments might have other types of credentials for the second credential set. Examples of these other credentials include: biometric data (e.g., fingerprint data, sequence of fingerprint data), biometric image data, or another type of credential data.

If the device requires the second credential set, the server set provides an access recovery parameter (ARP) to the device after the device successfully gains access to the account by providing the first credential set. In some embodiments, the device encrypts the ARP by using the second credential set and stores the encrypted ARP (e.g., locally on the device). Subsequently, the device can use the ARP to re-gain access to the account. For instance, in some embodiments, the device can use the ARP to change at least a portion of the first credential set (e.g., to change the account password) without providing the complete first credential set (e.g., without providing the account password). To do this, the device in some embodiments (1) obtains the second credential set from the user, (2) authenticates the second credential set, and (3) after authenticating the second credential set, provides the ARP to a set of servers that allow the device to change at least part of the first credential set. In some embodiments, the device uses the second credential set to decrypt the encrypted ARP, before sending the ARP to the server set. In some embodiments, the server set that receives the ARP from the device is the same server set that provided the ARP to the device in the first instance. In other embodiments, the two server sets are different.

Figure 2:
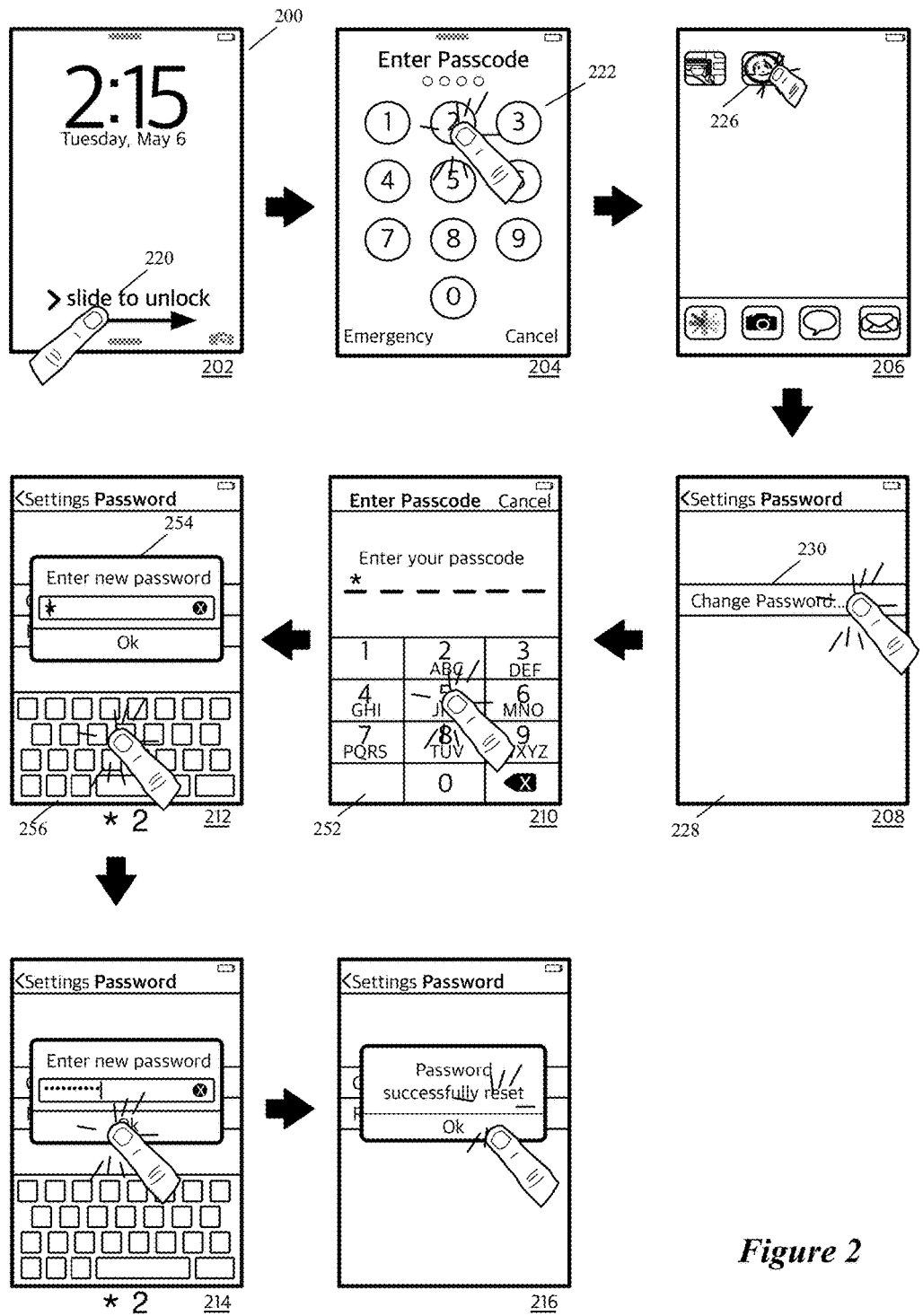
FIG. 2 illustrates an example of a process for credential rest of FIG. 1.

FIGS. 1 and 2 illustrate an exemplary process that implements the credential reset method of some embodiments of the invention. In this example, the process provides a passcode-protected mobile device 200 with an ARP when the device initially logs into an account, and then allows the device to subsequently change the account password by using the ARP so long as the user provides the device passcode with the requested password change. Accordingly, in this example, the portion of the first credential set that the device changes is the account password. Also, in this example, the second credential set is a passcode that is needed to unlock the device.

FIG. 1 illustrate a process 100 that the server set performs when a device initially logs into an account associated with at least one service provided by the server set. As shown, the process 100 initially receives (at 105) from the device a set of account credentials to log into a desired service associated with the account. In some embodiments, the received credential set includes a username (e.g., a name or email) and a password.

In other embodiments, the received credential set includes one or more other parameters. For instance, in some embodiments, the credential set also includes a second factor authentication parameter that is needed to authenticate the user. Examples of such second factor authentication parameters include alphanumeric characters that are either emailed to the user, texted to the user, or displayed on another user device associated with the account. As part of the login credentials for an account, the user in some embodiments needs to provide such a second factor authentication parameter along with a username and password (e.g., after providing the username and password). The received credential set can include still other parameters, such as biometric data (e.g., one finger print or a sequence of finger prints), biometric image data, etc.

The process then determines (at 110) whether the received credential set is authentic. For instance, in some embodiments, the process 100 determines (at 110) whether the received username and password match the username and password associated with an account that is registered for the desired service. In other embodiments, the process (at 110) not only authenticates the username and password, but also authenticates the second factor authentication parameter. In some embodiments, the user first provides the username and password to the process 100 and then goes through a second factor authentication (SFA) process that is initiated by this process (e.g., after this process authenticates the username and password) in order to provide the SFA parameter to the process 100. After receiving the SFA parameter, the process 100 authenticates the SFA parameter. Second factor authentication processes will be further described below.

If the process determines (at 110) that the received credential set is not authentic, the process rejects (at 115) the login attempt and then ends. Otherwise, the process transitions from 110 to 120, where it determines whether access to the mobile device is restricted by a passcode. To satisfy this determination at 120, the device in some embodiments not only needs to be passcode protected, but the passcode has to have certain characteristics (e.g., have at least six or more characters). Also, in some embodiments, the process 100 receives indication of the device's passcode protection status and/or parameters with the login credentials that it receives (at 105). In other embodiments, the process 100 directs (at 120) the device to provide information about its passcode protection status and/or parameters.

When the process determines (at 120) that a passcode is not required to gain access to the device, or a passcode is required but the passcode does not have the desired characteristics, the process 100 provides (at 125) the device with a service access token and then ends. For subsequent accesses to the requested service by the device through the associated account, the device can provide the service token to the server set. This frees up the device from having to ask the user for the account login credentials for the subsequent accesses. Also, by storing this token and using this token for subsequent accesses, the device does not have to store the account credential set locally on its storage. In some embodiments, the device stores the service token in an encrypted fashion, or in another protected manner.

When the process determines (at 120) that the device has the needed passcode, the process 100 provides (at 125) the device with a service access token and an ARP, and then ends. In some embodiments, the device then encrypts the ARP by using its passcode and stores the encrypted ARP (e.g., locally on the device). Subsequently, the device can use the ARP to change at least a portion of the account credential set (e.g., to change the account password) without providing the complete account credential set (e.g., without providing the account password).

This is highly beneficial when the user does not remember the account password and needs to change it. The ARP allows the user to do this by simply providing the passcode for the device. In other words, so long as the user remembers the passcode for his device, the user can change the account password so long as the device has previously received an ARP. After receiving the passcode, the device (1) uses the passcode to decrypt the encrypted ARP, and then (2) provides the ARP with a new password to the server set.

When a device receives an ARP because it has a passcode (or other access control) that meets a threshold criteria, the device in some embodiments has to monitor changes to its passcode (or its other access control) to determine whether the modified passcode (or modified access control) falls below the required threshold criteria for having an ARP. When the modified passcode (or modified access control) falls below the required threshold, the device in some embodiments discards the ARP and informs the server set that it has discarded the ARP.

FIG. 2 illustrates an example of using a device's passcode to reset the password associated with an account that is used to access one or more services. The credential-recovery method of these embodiments allows a user of the device (e.g., a smartphone or tablet) to change the password for accessing an account so long as the user remembers the passcode that is needed for unlocking the device. The example of FIG. 2 is illustrated in terms of eight operational stages 202-216 of the device's user interface (UI). In this example, the device has a touch sensitive screen that allows the user to interact with the device's UI through touch input.

The first stage 202 shows the user performing a swipe gesture on an unlock control 220 at the bottom of the screen. As shown by the second stage 204, this gesture causes the device to show a keypad 222 for the user to employ to enter a six character passcode that is needed to unlock the device. If the user cannot provide this passcode, the device will not unlock and the user cannot use the device for any purpose in some embodiments. In other embodiments, the device can be used for limited purposes (e.g., making emergency calls, taking photos, setting alarms, etc.) without providing the passcode. In some embodiments, the device passcode can be N characters or more, depending on user preference. However, in some of these embodiments, the server set requires a device to have a certain length passcode (e.g., 6 characters) before providing an ARP to the device.

The third stage 206 shows the device after it has been unlocked. This stage also shows the user selecting a Setting icon 226 to gain access to several controls that are provided by the device's operating system for managing and controlling the device. The fourth stage 208 shows a settings page 228 that has a control 230 for resetting the password associated with an account accessed by the device. The fourth stage shows the user selecting this password reset option 230.

In response to this selection, the device 200 prompts the user with a page that directs the user to provide the device's passcode again, as shown by the fifth stage 210. This page has a keypad 252 for the user to use to enter the passcode. This passcode is requested as it is the passcode that was used to obtain the ARP from the server set. Also, in some embodiments, this passcode is used to encrypt the ARP, which is then stored on a storage of the device. Hence, this passcode is needed (1) to verify that the person that is requesting the password reset is the person who has permission to unlock the device with the requisite passcode, and (2) to decrypt the encrypted ARP. In this example, this passcode is the same six digit passcode that is used to unlock the device in the second stage 204.

After the user provides the device's passcode, the sixth and seventh stages 212 and 214 illustrate that the device requires the user to enter a new password twice, as denoted by the legend "x2" at the bottom of these two stages. In these stages, the device presents a password entry window 254 and an on-screen keyboard 256. Through the keyboard, the user enters the new password and selects "OK" in the window 254. If the user fails to enter the same password twice, the device provides an error message and/or directs the user to provide a new password two more times in some embodiments.

Once the user provides the same password twice, the device sends the new password along with the decrypted ARP (which the device decrypted by using the passcode) to the server set and directs the server set to modify the password for the account. Once the server set authenticates the ARP, modifies the account's password, and informs the device of this change, the device provides confirmation of the password reset, as shown in the eight stage 216.

One of ordinary skill will realize that many of the features of the example illustrated in FIGS. 1 and 2 are not implemented in other embodiments of the invention. For instance, in some embodiments, the device is unlocked through touch gestures on the device's screen (e.g., touch gestures that trace a pattern on the device's screen), or non-touch gestures detected by the device's motion sensors (e.g., particular pattern of taps on the back of the device). Some of these embodiments use the touch or non-touch gestures (1) as the device-access control that is needed in order to allow the device to receive the ARP from the server set, and (2) as the user input that is needed in order to decrypt the ARP and request a change to the account credential set.

Instead of, or in conjunction with, passcodes, touch gestures, or non-touch gestures, some embodiments use one or more user fingerprints as one or more secondary credentials to obtain and/or use the ARP. Some embodiments require the use of multiple such secondary credentials (e.g., the use of both a fingerprint and a passcode or gesture). In other embodiments, the server set requires yet other secondary credentials to gain access to the ARP. Examples of such other secondary credentials include passwords for other accounts and/or services, or secondary authentication parameters obtained from other devices associated with the account.

When the server set provides a particular device with the ARP, the server set in some embodiments also provides an access continuation parameter (ACP) to the particular device. After the credential set for accessing the account has been changed by another device, the particular device can still access the account by using the ACP in place of the modified credential set. For instance, in some embodiments, multiple devices can be given access to the same account when they each provide the requisite first credential set. Each such device is given an ACP and a service token for accessing the account when the device provides the first credential set. When one of these devices is lost, inactive, or otherwise compromised, or a user sees suspicious activity on his/her account, the server set allows the user to change the first credential set (e.g., to use the ARP to change the account password by using a device's passcode).

In this situation, the server set also (1) makes all the service tokens that it handed to all the devices inactive and (2) makes the ACP of any lost, inactive, or compromised device invalid. Subsequently, when a device tries to access the account by using its token, the server set rejects the token and directs the device to provide its ACP. Once the device provides its ACP, the server set then checks the ACP to make sure that it is a valid one (e.g., to make sure that the provided ACP is on a list of valid ACPs for the account). If the provided ACP is valid, the server set provides another service token to the device in some embodiments. The device can then use this token for subsequent accesses to the account. In this manner, this device does not need to provide the changed first credential set to the server set to gain access to the account, because it can provide the ACP as a substitute credential in place of the modified first credential set.

In some embodiments, the server set does not invalidate previously provided ACP(s) when the user indicates that he/she wants to change the first credential set (e.g., the account password) to maintain credential hygiene or to obtain a new credential because the user has forgotten the old credential. For instance, in some embodiments, the server set and the devices implement an intent-based credential reset method that only revokes an ACP for credential resets that are associated with lost, inactive, or compromised devices, or to address suspicious account activity. In some embodiments, the intent-based credential reset method prompts the user to specify the reason for the requested change to the account credential. When the user specifies the reason for the credential reset is a lost, inactive, or compromised device, the method provides a prompt that asks the user to identify (1) any device that should be maintained as an active device for the account, (2) any device that should be made inactive for the account, or (3) both active and inactive devices for the account. Based on the user's input, the method then deletes or makes otherwise inactive the ACP of any inactive device, while maintaining the active status of the ACP of any device that is still active.

Figure 3:
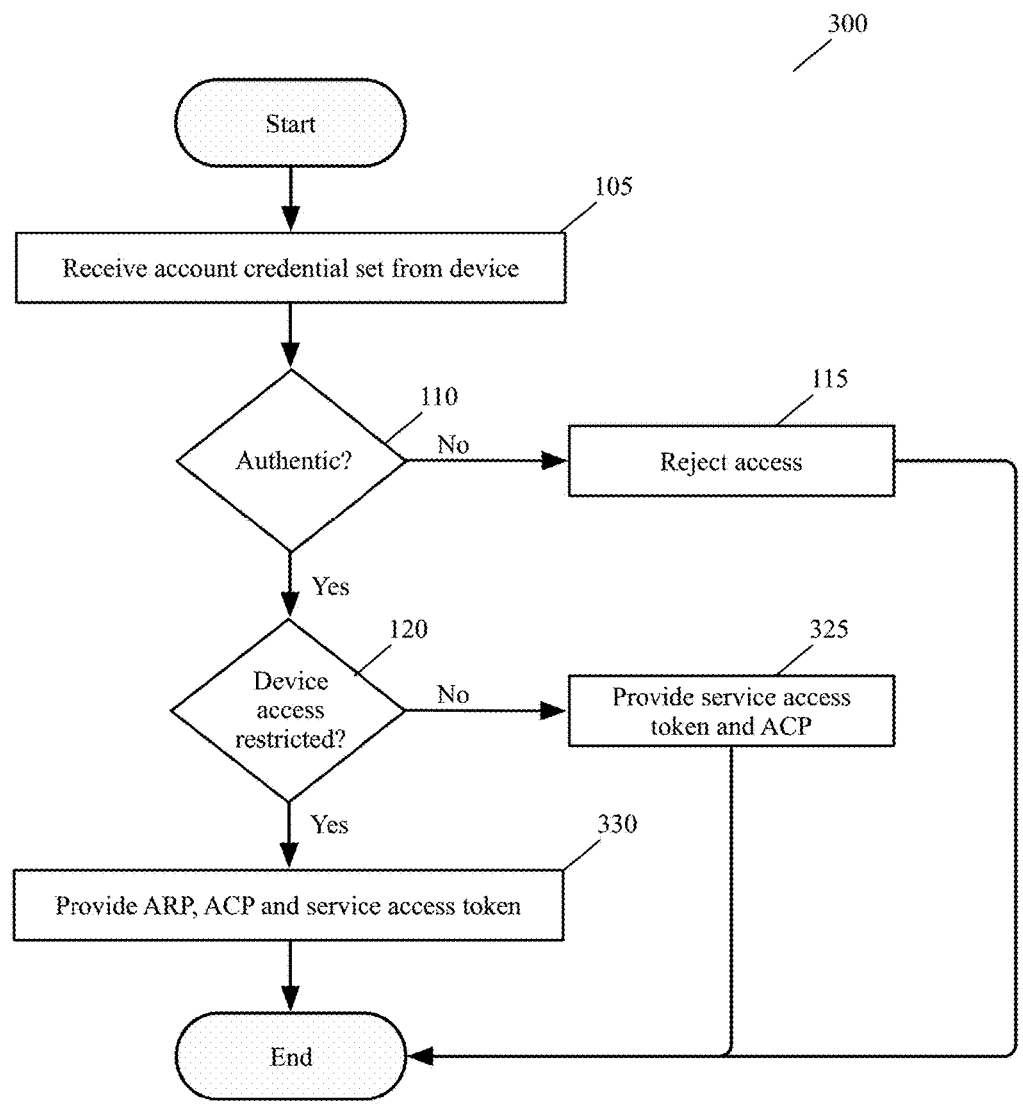
FIG. 3 illustrates a process for initially logging into an account of some embodiments.

FIGS. 3-7 illustrate an example of the intent-based credential reset method of some embodiments. FIG. 3 illustrate a process 300 that the server set performs when a device initially logs into an account associated with at least one service provided by the server set. The process 300 is identical to the process 100 of FIG. 1, except that the process 300 (1) provides (at 325) an ACP with the service token when it determines (at 120) that access to the device is not restricted by a required passcode (or a gesture or other access control mechanism in other embodiments), and (2) provides (at 330) an ACP with the ARP and service token when it determines (at 120) that access to the device is restricted by the required passcode (or gesture or other access control mechanism in other embodiments).

Figure 4:
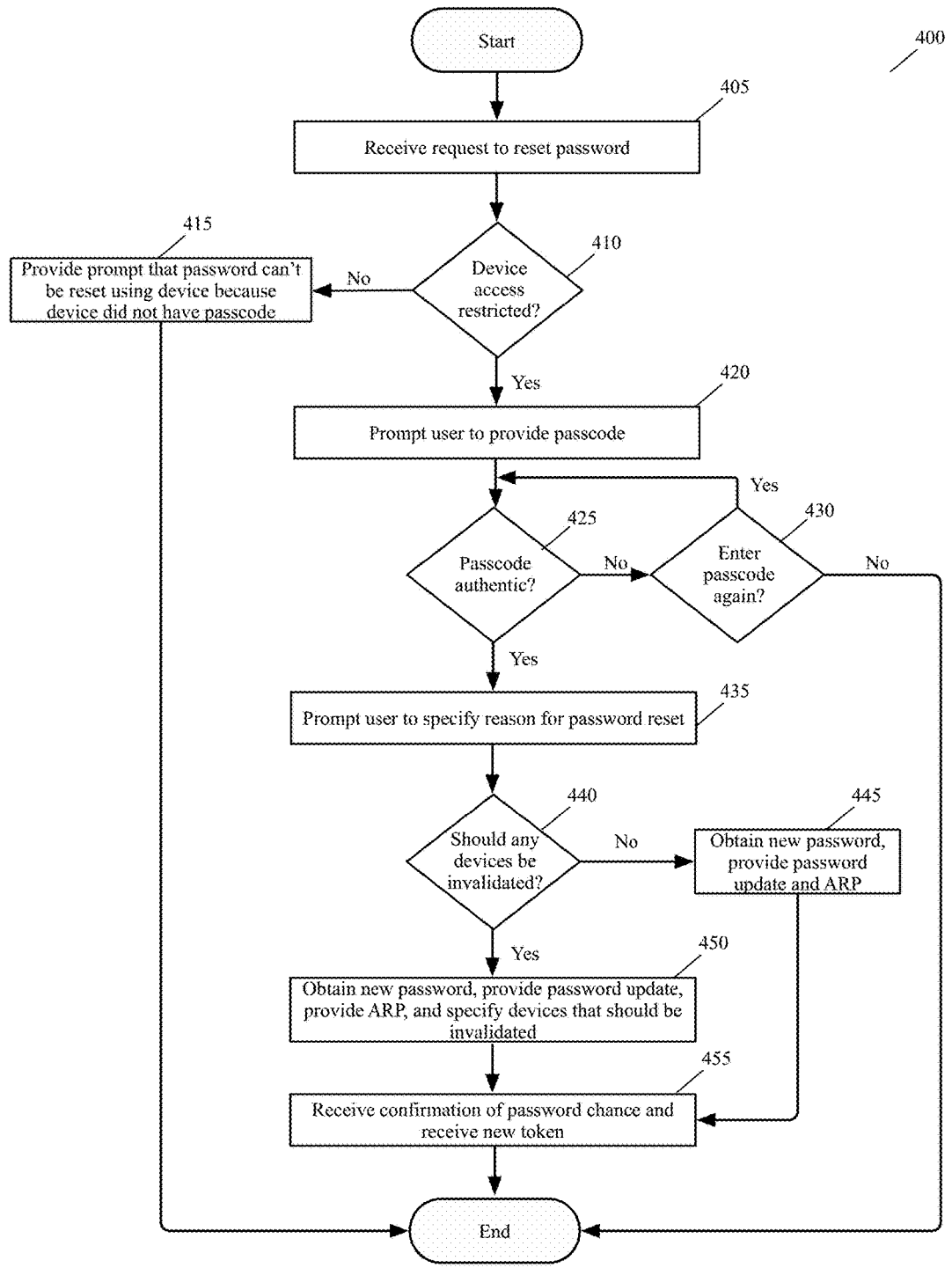
FIG. 4 illustrates a process for performing an intent-based credential reset of some embodiments.
Figure 5:
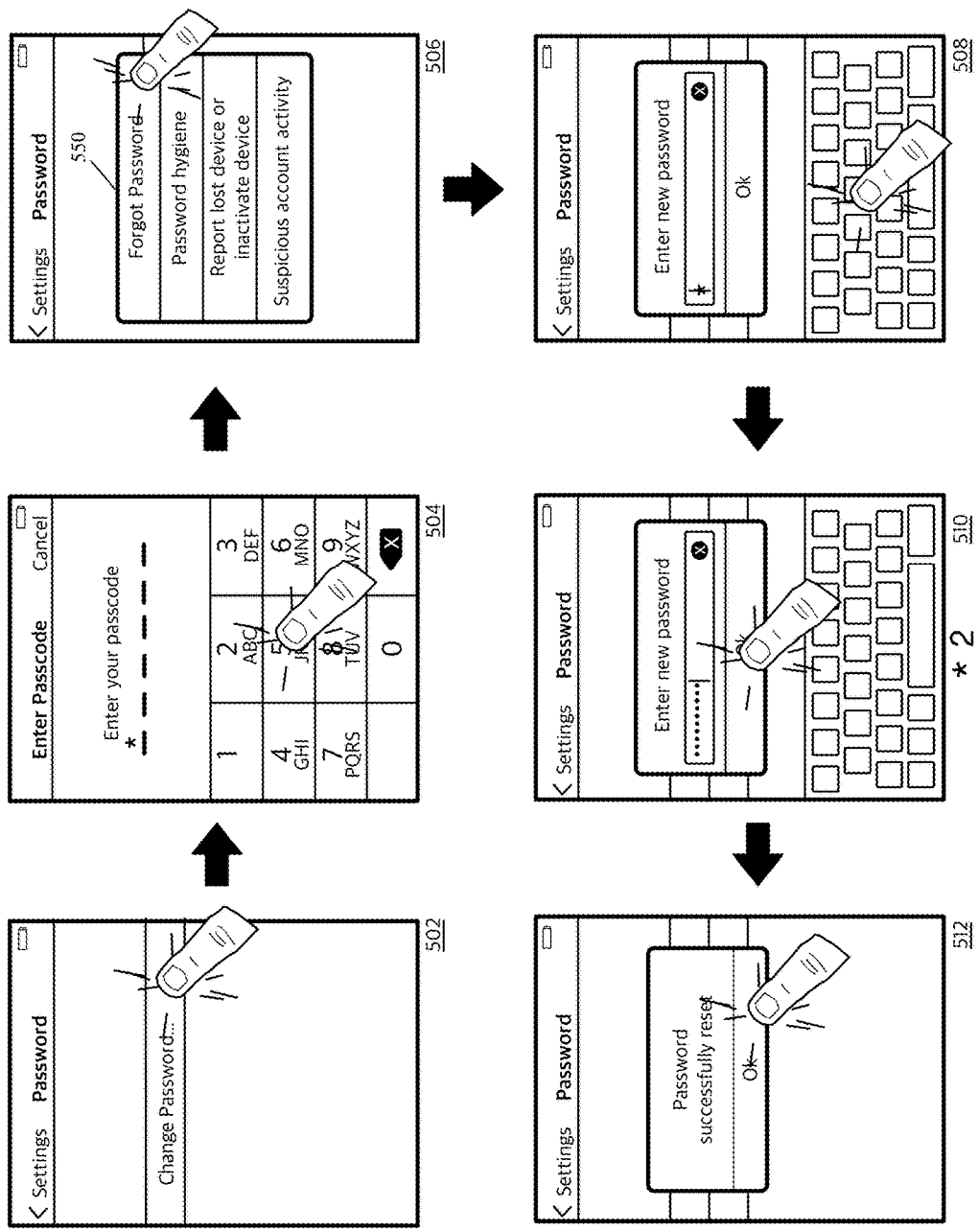
FIGS. 5-7 illustrate examples of a process for performing an intent-based credential reset of FIG. 4.
Figure 6:
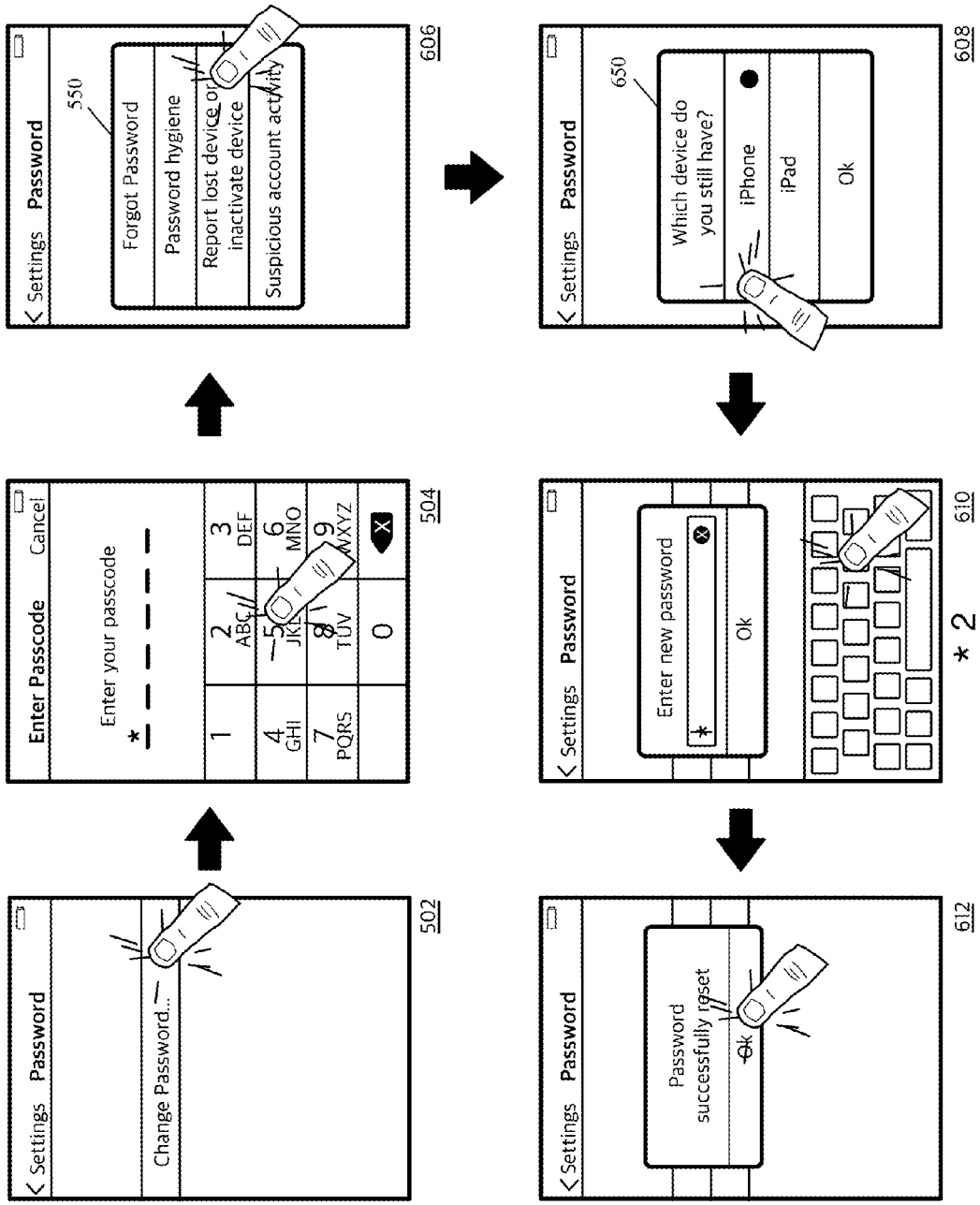

FIG. 4 illustrates an intent-based credential reset process 400 that a device in some embodiments performs. This process will be explained by reference to two password reset examples that are illustrated in FIGS. 5 and 6. Both of these examples are illustrated in terms of six operational stages of the device's UI. The first two stages 502-504 in both of these examples are the same. These two stages are identical to stages four and five 208 and 210 of FIG. 2 in that during these two stages, the user starts (at 502) a password change process and provides (504) the device's passcode in support of this change.

In FIG. 4, the user's request to reset the password is depicted as operation 405. After receiving this request, the process 400 determines (at 410) whether the access to the device is restricted by a required passcode (or required gesture or other access control mechanism in other embodiments). In some embodiments, the process 400 requires the passcode to be of a certain minimum length (e.g., six characters), while in other embodiments, this process just requires the device to have a passcode to unlock it.

When the process 400 determines (at 410) that access to the device is not restricted by a required passcode, the process provides (at 415) a prompt on the device's display screen to inform the user that the password cannot be reset by using the device because the device does not have a required passcode (e.g., any passcode in some embodiments, or a passcode that meets a certain criteria in other embodiments). After 415, the process ends.

Instead of providing this prompt at 415, the process 400 provides other prompts in other embodiments. For instance, in some embodiments, the process provides (at 415) a prompt that directs the user through a series of questions that need to be answered correctly, before the server set resets the password. In yet other embodiments, the process starts (at 415) a password reset process that requires the user to access an electronic message (e.g., a text message or email) that is sent by the server set in order to reset the password. In still other embodiments, the device does not provide the password change option as a selectable option in the device's Settings menu (e.g., as shown in the first stage 502 of FIGS. 5 and 6) when the device does not have the required passcode protection.

When the process 400 determines (at 410) that access to the device is restricted by a required passcode, the process provides (at 420) a prompt to direct the user to provide the device passcode. One example of such a prompt is shown in the second stage 504 of FIGS. 5 and 6. After receiving the passcode, the process determines (at 425) whether the entered passcode is authentic. If not, the process determines (at 430) whether it should prompt the user again to provide the passcode. In some embodiments, the process 400 only allows a user to try to enter the correct passcode a certain number of times before rejecting the password reset request. Also, in some case, the user might cancel the password-reset operation by selecting a cancel option that is presented in the passcode-reset prompt. Thus, the process ends after 430 when the user cancels the password reset operation or when the user fails to provide the correct passcode after a certain number of tries. Otherwise, the process prompts (at 430) the user to provide the passcode again and returns to 425 to determine whether this passcode is authentic When the process determines (at 425) that the entered passcode is authentic, the process provides a prompt (at 435) to allow the user to specify the reason for the password reset. One example of this prompt is shown in the third stages 506 and 606 of FIGS. 5 and 6. This prompt 550 requires the user to select one of four choices that describe the intent behind the password reset. These four choices are: (1) forgotten password, (2) maintain password hygiene, (3) lost/inactive device, and (4) suspicious account activity.

In some embodiments, selection of one of the last two choices (i.e., lost/inactive device and suspicious activity) causes the process 400 to provide a prompt that requires the user to identify the account-associated devices that are in the user's possession. This prompt lists all account-associated devices, which were previously associated with the account (e.g., by the user). One example of such a prompt 650 is shown in the fourth stage 608 of FIG. 6. In some embodiments, the prompt 650 shows the device that is displaying the prompt as greyed out, since obviously this device is in the user's possession.

In other embodiments, selection of the last two choices (i.e., lost/inactive device and suspicious activity) results in a prompt that requires the user to identify the account-associated devices that are not in the user's possession, that should be inactivated, or that show suspicious activity. One example of such a prompt will be further described below by reference to FIG. 8. In yet other embodiments, selection of the last two choices results in a prompt that requests the user to identify both (1) the devices that should remain as active, and (2) the devices that should be made inactive.

Selection of the last two choices results in a prompt that requires the user to identify the active devices and/or inactive devices because in response to this selection, the process 400 will send to the server set a list of one or more devices that should be inactivated along with a message that the user wants to reset the account password. When the user selects the first two choices (e.g., forgotten password or password hygiene) in the prompt, the process 400 does not provide a prompt that requires the user to identify the active devices and/or inactive devices, as shown by the third and fourth stages 506 and 508 of FIG. 5. This is because in this situation, the process 400 does not provide to the server a list of devices that should be inactivated. It just informs the server set that the user has requested a password reset. In response to a password reset message, the server set invalidates the service tokens that it previously handed out to all of the devices that are associated with the account. If the server set also receives a list of devices to inactivate, the server set also removes or invalidates the ACP of any device on this list from the ACP records that it maintains for the account, as further described below.

After providing the prompt 550, the process 400 determines (at 440) whether the user selected the third or fourth choice in this prompt, which require one or more devices to be made inactive. If so, the process 400 (at 450) obtains a new password from the user, and provides to the server set (1) a password-change request, (2) the new password, (3) the ARP that the process decrypts by using the passcode provided at 425, and (4) a list of devices that should be inactivated. As shown by the fifth stages 610 of FIG. 6, the process 400 in some embodiments requires the user to enter the new password twice before sending the server set the password update. From 450, the process transitions to 455, which will be described further below.

When the process 400 determines (at 440) that the user selected the first or second choice in the prompt 550, the process 400 (at 445) obtains a new password from the user, and provides to the server set (1) a password-change request, (2) the new password, and (3) the ARP that the process decrypts by using the passcode provided at 425. As shown by the fifth stage 510 of FIG. 5, the process 400 in some embodiments requires the user to enter the new password twice before sending the server set the password update. From 445, the process transitions to 455.

After the server set has received the password-change request from the process 400, the server set processes this request (e.g., authenticates this request, invalidates any ARP if necessary, generates a new service token, etc.) and provides the process 400 with a confirmation of the password change and a new service token for the device. The process receives (at 455) the password-change confirmation and the service token, and then ends. As shown in the sixth stages 512 and 612 of FIGS. 5 and 6, the process 400 provides a notification once the password has been successfully changed.

Figure 7:
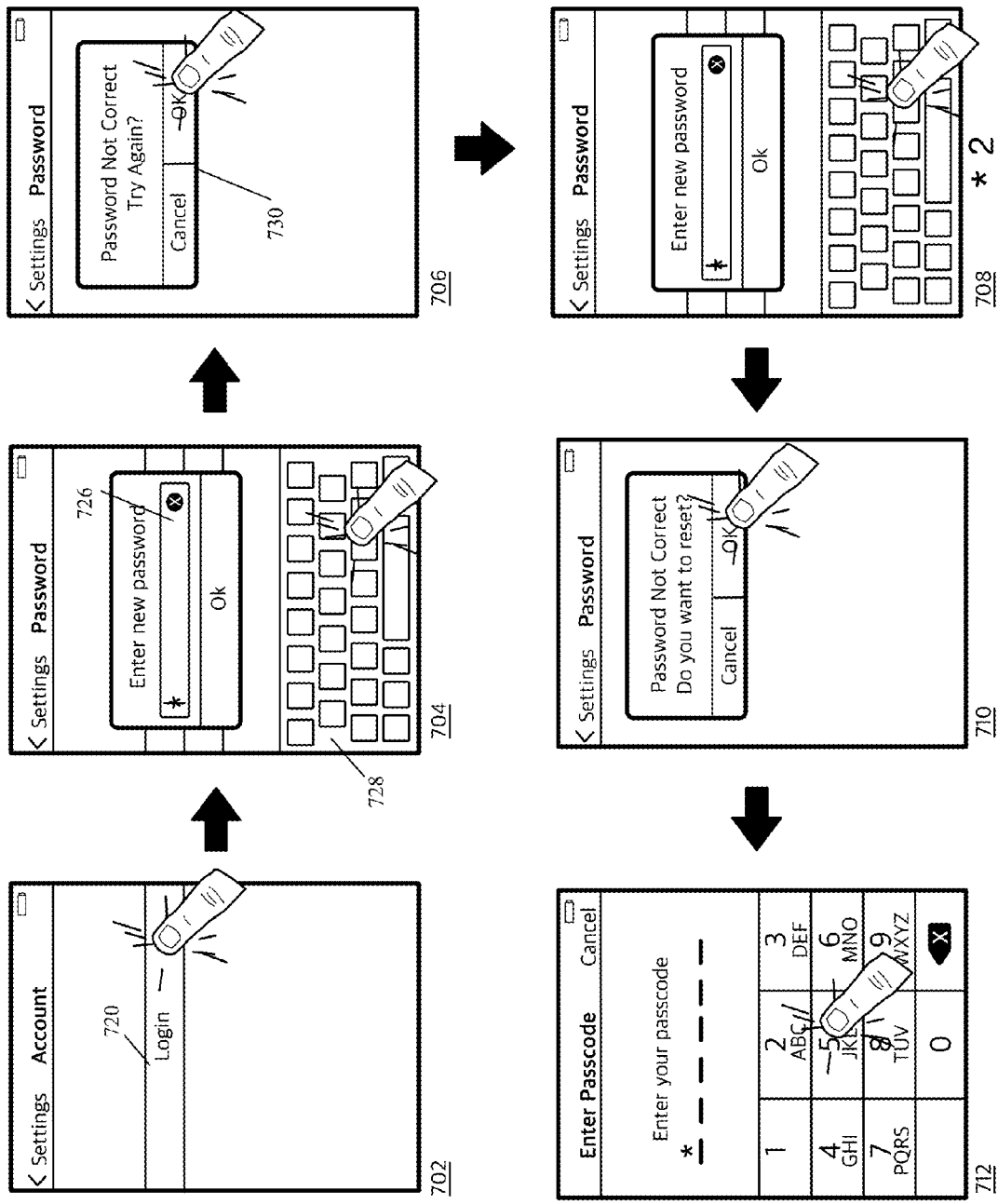

In the above-described examples, the user requests a password reset through a control in the device's setting menu. In addition to this control, or instead of it, some embodiments have the device prompt the user for a password reset after N failed attempts by the user to login to the associated account (i.e., the account associated with the password). FIG. 7 illustrates one such approach in terms of six operational stages 702-712 of the device's UI. The first stage 702 shows the user selecting a login control 720 on a page for the account in the Setting menu of the device.

The second stage 704 shows the user entering the account password in a password field 726 through an on-screen keyboard 728. The third stage 706 shows a prompt 730 that informs the user that he has entered the password incorrectly. The prompt also gives the user an option to cancel the login or an option to enter the password again. As shown, the user selects the option to enter the password again.

The fourth stage 708 shows the user entering the password two more times, as denoted by the legend "x2" at the bottom of this stage. Both times, the user enters the wrong password. To simplify the presentation of this example, FIG. 7 does not show the prompt 730 that the device shows between the second and third failed password entry attempts to inform that the password provided in the second attempt is incorrect.

After the two failed password entry attempts depicted by the fourth stage 708, the fifth stage 710 shows the device informing the user of the incorrect password and providing the user with an option to reset the password. The user selects this option in the fifth stage 710. The sixth stage 712 then shows the device prompting the user to enter the device passcode in order to use the device's password reset feature. The device's behavior after this stage 712 is similar to the device's behavior after stage 210.

Figure 8:
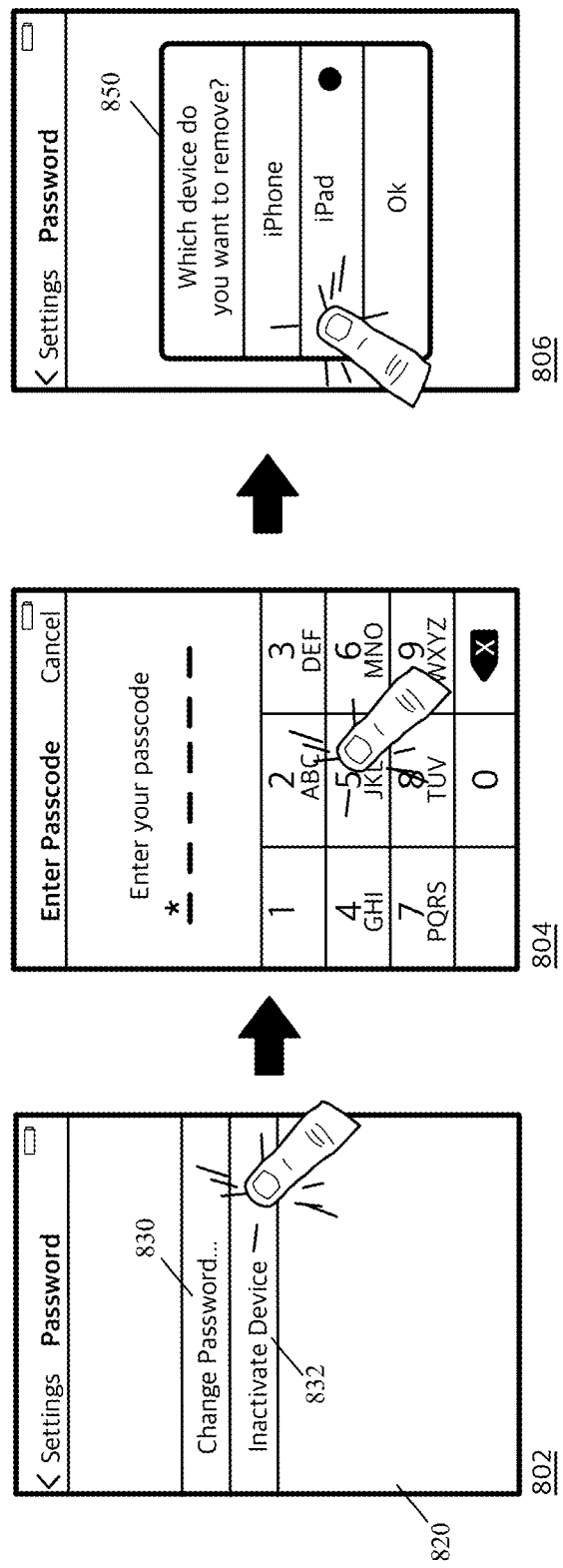
FIG. 8 illustrates an example of inactivating a device without resetting a password.

In the above-described examples, the device's setting menu only provides a control for resetting the password. As part of this process, the user can inactivate a device (e.g., a lost or stolen device), as described above by reference to FIGS. 5 and 6. In some embodiments, the device's settings menu provides a control for inactivating a device without resetting the password. FIG. 8 illustrates an example of one such control in terms of three operational stages 802-806 of the device.

The first stage 802 shows a settings page 820 that has two setting controls, one control 830 for resetting the password associated with an account accessed by the device, and another control 832 for inactivating devices (e.g., lost or stolen devices) that are also associated with this account. The first stage 802 shows the user selecting the inactivate device control 832.

The second stage 804 shows the device prompting the user to enter the device passcode and the user starting to enter this passcode. The device provides this prompt because in order to inactivate a device associated with an account, the user has to provide the device passcode in some embodiments. In other embodiments, the user has to provide another credential or credential set, e.g., the user has to perform a touch or non-touch gesture for unlocking the device.

The third stage 806 shows the device providing a prompt 850 that requires the user to identify the account-associated devices that should be made inactive. This prompt lists all account-associated devices, which were previously associated with the account (e.g., by the user). In other embodiments, the prompt requires the user to identify the account-associated devices that are in the user's possession (i.e., that should be maintained as active). In yet other embodiments, the prompt directs the user to identify both (1) the devices that should remain as active, and (2) the devices that should be made inactive.

After the user has identified the devices that should be made inactive in the prompt 850, the user selects "OK" in this prompt's window. This directs the device to send to the server set a list of one or more devices that should be inactivated. In response to this message, the server set removes or invalidates the ACP of any device on this list from the ACP records that it maintains for the account. In some embodiments, the server set also invalidates the service tokens that it previously handed out to all of the devices that are associated with the account. This ensures that all devices have to provide their ACPs to gain access to the account again. When any inactivated device provides its ACP, the server set rejects this device as the ACP is no longer active or on its list of valid ACPs for the account.

Figure 9:
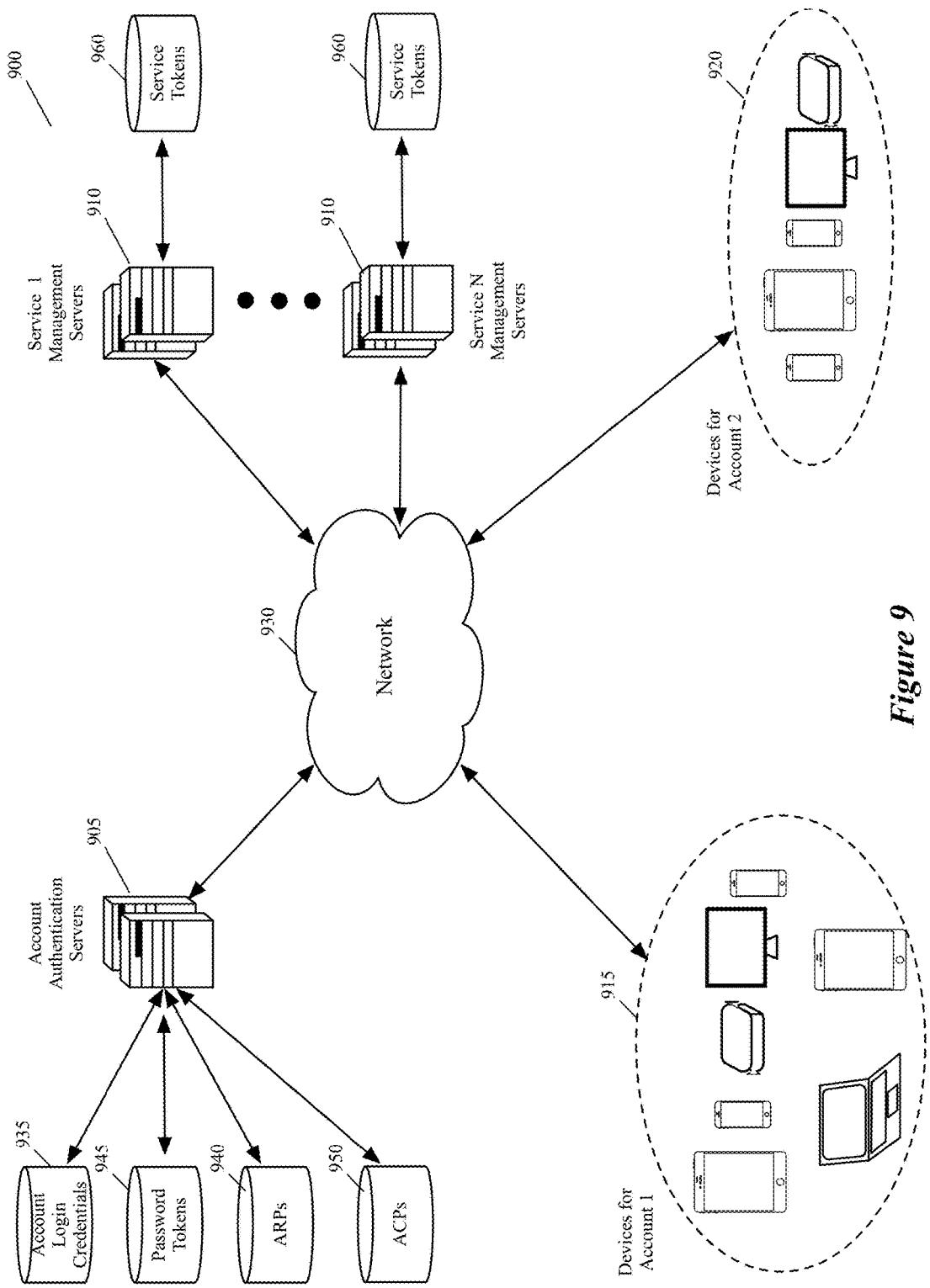
FIG. 9 illustrates a service delivery system of some embodiments.

In several embodiments described above, one set of servers is mentioned for providing service access tokens, ARPs, and ACPs. These different operations, however, are performed by different sets of servers in some embodiments. FIG. 9 illustrates one such approach. Specifically, this figure illustrates a service delivery system 900 that uses (1) a set of authentication servers 905 for allowing devices to log into different accounts, and (2) several sets of service servers 910 that allow the devices to access several services after logging into their respective accounts. Each of these sets of servers 905 and 910 can have just one server or more than one servers.

As shown, the devices and the server sets are communicatively coupled through a network 930 (such as the Internet). FIG. 9 illustrates two sets of devices 915 and 920 that are associated with two different accounts. Examples of such devices include smartphones, tablets, desktop computers, laptop computers, streaming media players (e.g., AppleTV, etc.), etc. For each account, each device can access multiple services that are provided by multiple different sets of service servers 910 after the device logs into the account. Examples of such services include email services, photo-sharing services, content-sharing services, etc.

To log into an account, each device obtains from a user the account login credentials and forwards them to the authentication server set 905. The login credentials in some embodiments includes only username and password. In other embodiments, the login credentials not only include username and password, but also include a second factor authentication parameter that is needed to authenticate the user. Examples of such second factor authentication parameters include alphanumeric characters that are either emailed to the user, texted to the user, or displayed on another user device associated with the account. As part of the login credentials for an account, the user in some embodiments needs to provide such a second factor authentication parameter along with a username and password (e.g., after providing the username and password). Second factor authentication methods of some embodiments will be further described below.

After receiving the login credentials, the server set 905 authenticates the login credentials and provides an ACP and a password token to the device. The device can later use the ACP to stay logged into a service, as described above and further described below. The device supplies the password token to a service server set to gain access to the service that is provided by that service server set. As further described below, the service server set authenticates the supplied password token with the authentication server set, and then provides a service token to the device so that the device can use this token for subsequent accesses to the service server set.

In addition to the ACP and password token, the authentication server set can also provide an ARP to a device that provides the account credentials. For example, in some embodiments, the device informs the authentication server set that access to the device is restricted by a passcode or gesture that meets a threshold criteria. Because the device access is so restricted, the authentication then provides the ARP to the device. The device can then subsequently use the ARP to modify the account credential set.

As shown in FIG. 9, the service delivery system 900 includes several storages (e.g., several databases). These storages includes four sets of storages 935-950 that are used by the account authentication servers 905. These four sets of storages store the account-login credentials (in storage 935), the ARPs (in storage 940), the ACPs (in storage 950) and the password tokens (in storage 945). Each service server set 910 also uses the storages 960 to store the service tokens that this server set hands outs to authenticated devices. One of ordinary skill will realize that the service delivery system 900 use different storage structures and architectures in different embodiments to store the account-login credentials, the ARPs, ACPs, password tokens and service tokens.

Figure 11B:
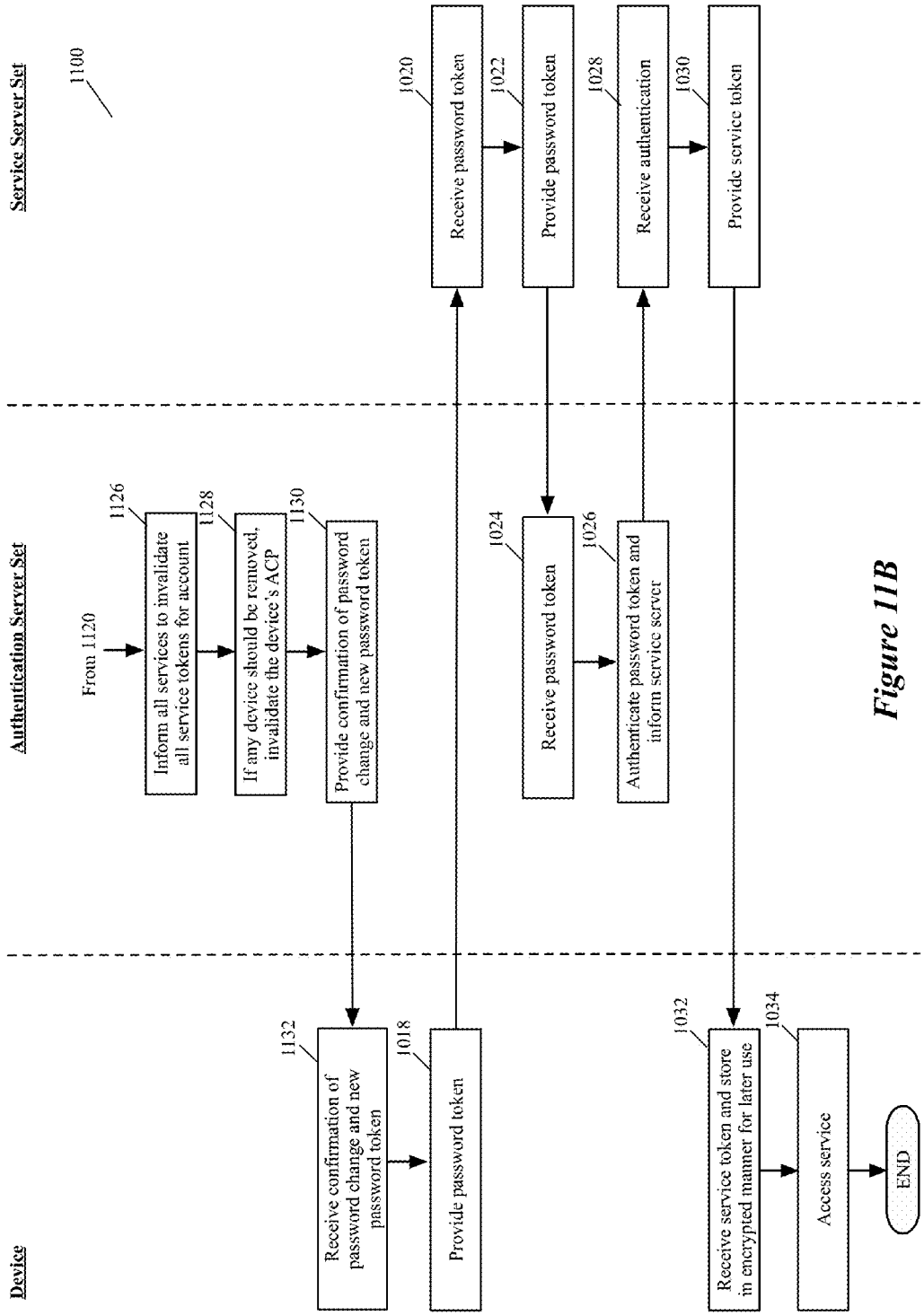
Figure 12A:
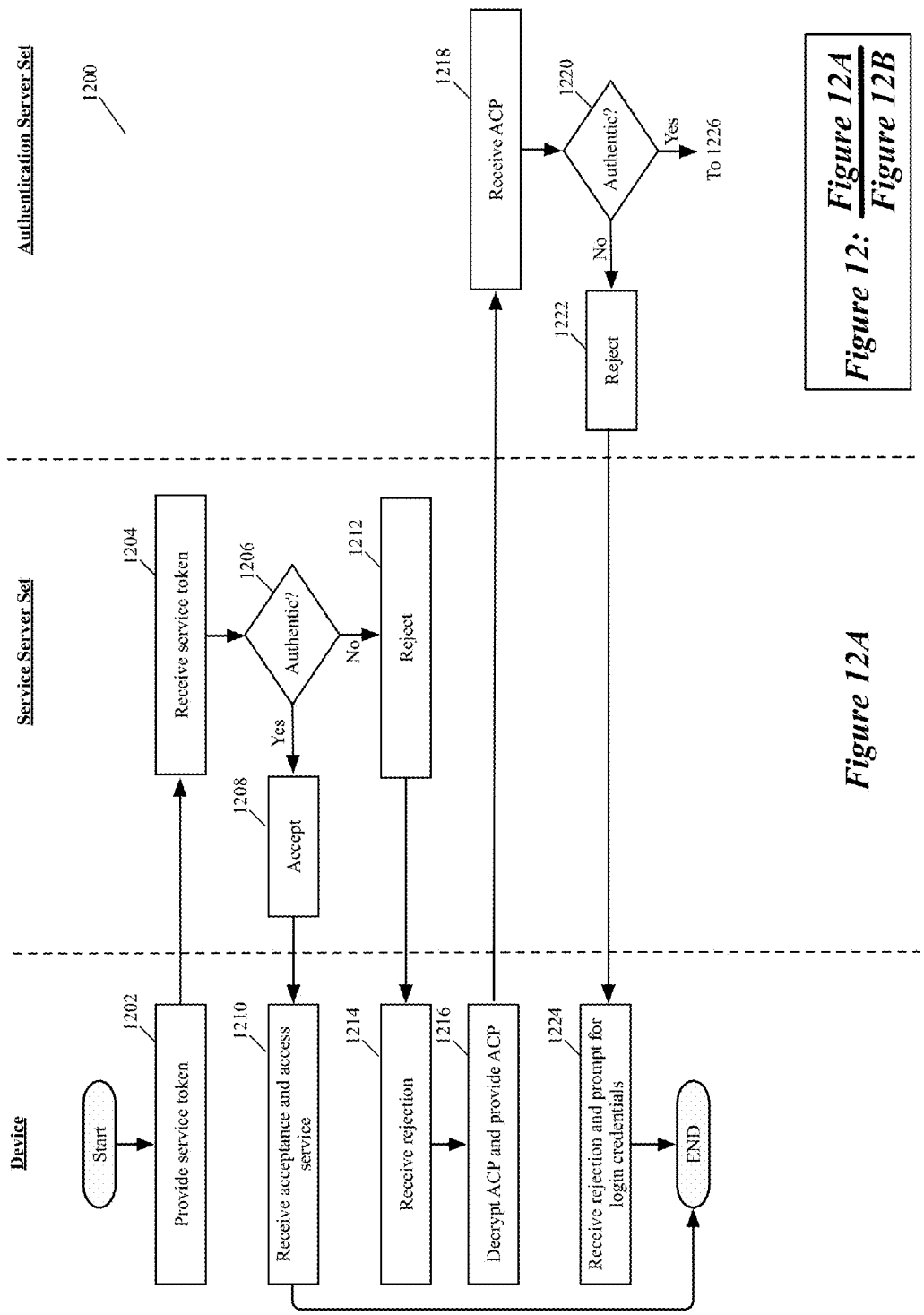
FIGS. 12A and 12B illustrate a process for using an access continuation parameter (ACP) to allow a device to stay logged into a service after the account login credential has been modified.
Figure 12B:
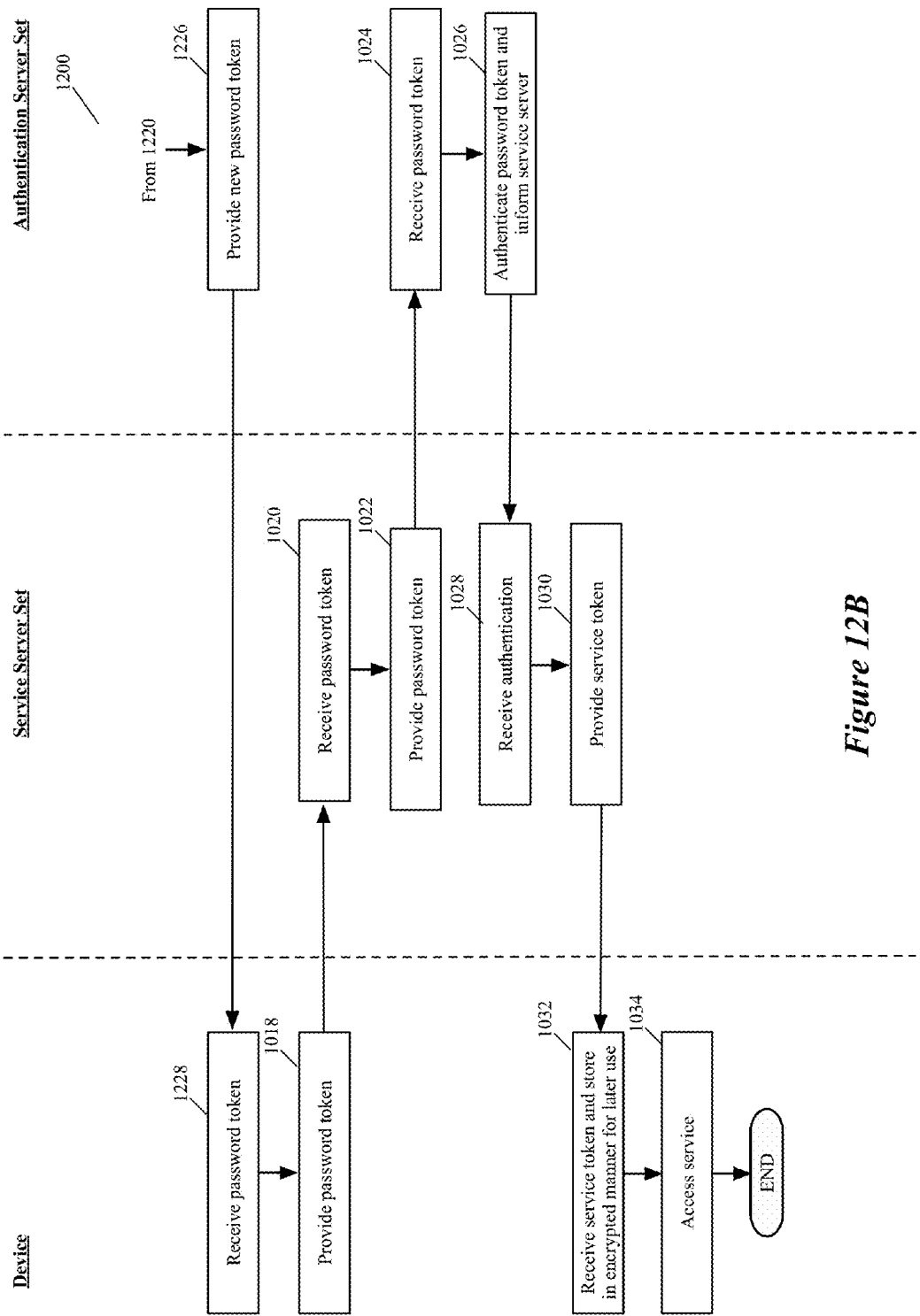

One exemplary set of interactions between a device, the authentication server set, and the service server set will now be further described by reference to FIGS. 10-12B. FIG. 10 illustrates a process 1000 for initially logging a device into a service server set that provides a service to devices associated with an account. FIGS. 11A and 11B illustrate a process 1100 for using the ARP to modify the account login credentials. FIGS. 12A and 12B illustrate a process 1200 for using the ACP to allow a device to stay logged into a service after the account login credential set has been modified without requiring the device to provide the modified login credential set.

As shown in FIG. 10, the login process 1000 starts with the device sending (at 1002) a credential set for logging into an account to the authentication server set 905. In some embodiments, the login attempt can be only for one type of service provided by one service server set 910, while in other embodiments, the login attempt can be for multiple services that are provided by multiple service server sets 910. Typically, the device receives this credential set from a user. However, in some embodiments, this credential set can be provided by a configuration file or process that is loaded on the device. In some embodiments, the credential set includes a username and password. In other embodiments, the received credential set includes one or more other parameters (e.g., second factor authentication parameter).

With the credential set, the device also sends (at 1002) to the authentication server set an indication that access to the device is restricted by a passcode that meets the required threshold for receiving an ARP from the authentication server set. If access to the device is restricted through other means (e.g., through a gesture), the process would provide (at 1002) indication of the sufficiency of this access control mechanism in other embodiments. As mentioned above, other embodiments use other credential sets in place of device access credentials as the secondary credential sets to allow the device to obtain the ARP. Also, when the device does not have a required access control mechanism or another required secondary credential set, the device provides (at 1002) an indication that it does not have this required mechanism or credential set. In addition, in some embodiments, the device does not provide, with the account login credential set, an indication of whether it has the required access control mechanism or another required secondary credential set. Instead, in these embodiments, the device provides this information in response to a later request for this information from the authentication server set.

After receiving (at 1004) the credential set and indication of the device's sufficient access restriction (e.g., indication of the sufficiency of the device passcode), the authentication server set 905 determines (at 1006) whether the received credential set is authentic. For instance, in some embodiments, the authentication server set determines whether the received username and password match the username and password associated with an account that is registered for the desired service. In some embodiments, this server set 905 compares the received username and password to account login credentials that it stores in the credential storage 935, in order to authenticate the supplied login credentials. To authenticate the login attempt, the authentication server in some embodiments also authenticates a second factor authentication parameter that the device provides in some embodiments as part of its login credentials.

When the received credential set is not authentic, the authentication server rejects (at 1008) the login attempt, the device receives (at 1010) this rejection, and then process ends. On the other hand, when the authentication server set determines (at 1006) that the received credential set is authentic, the server set 905 provides (at 1012) the device with a password token, an ARP, and an ACP.

In some embodiments, the password token is a machine-generated password that an authentication server generates so that it can later verify this token once it receives it from a service server set, as further described below. To obtain the password token, the device in some embodiments specifies (at 1002) the service server set that it wants to access, and the authentication server set generates a password token for the service server set. In some embodiments, the authentication server set 905 only provides (at 1012) the device the password token and ACP if the device had indicated that it did not have the required access control mechanism (e.g., the desired passcode or gesture) or other required secondary credential set.

After receiving (at 1014) the password token, ARP and ACP, the device encrypts (at 1016) the ACP and ARP and stores the encrypted ARP and ACP (e.g., locally on the device). In some embodiments, the ACP and ARP are both keys. In some of these embodiments, the ARP is a more complex key than the ACP as the ARP confers more rights to the device (e.g., the ARP allows the device to reset the account credentials while the ACP just allows the device to stay logged into the account). Also, in some embodiments, the device encrypts the ARP by using its passcode.

After encrypting and storing the ARP and ACP, the device provides (at 1018) the password token to a service server set 910 in order to login to the service server set to receive a service. In some embodiments, the device provides a username with the password token. Once the service server set 910 receives (at 1020) the password token, it provides (at 1022) this password token to the authentication server set 905. In some embodiments, the service server set 910 provides the username to the authentication server set 905 with the password token.

The authentication server set receives (at 1024) the password token, authenticates (at 1026) this password token, and returns (at 1026) an indication of this authentication to the service server set 910. In some embodiments, the authentication server set 905 receives (at 1024) the username with the password token, and uses (at 1024) this username to authenticate the password token. In some embodiments, this server set 905 compares the received password token with tokens that it stores in the token storage 945, in order to authenticate the supplied password token.

After receiving (at 1028) the authentication from the authentication server set 905, the service server set 910 provides (at 1030) a service token to the device. The device then receives (at 1032) this service token and stores (at 1034) this service token. For subsequent accesses to the requested service by the device under the associated account, the device can provide the service token to the server set. This frees up the device from having to ask the user for the account login credentials for the subsequent accesses. Also, by storing this token and using this token for subsequent accesses, the device does not have to store the account credential set locally on its storage. In some embodiments, the device stores the service token in an encrypted fashion, or in another protected manner. The process 1000 ends after 1034.

FIGS. 11A and 11B illustrate a process 1100 for using the ARP to modify the account login credentials. The process 1100 is an intent-based credential reset process that is similar to the process 400 of FIG. 4. However, the process 1100 is a more detailed process that describes how the device in some embodiments interacts with the authentication and service server sets 905 and 910 of FIG. 9 to reset the account password.

As shown in FIG. 11A, the process 1100 starts when the device receives a user's request to reset the password (at 1102). In this example, it is assumed that the device is protected by a passcode that meets the threshold criteria for receiving the ARP. Thus, after receiving this request, the device provides (at 1104) a prompt to direct the user to provide the device passcode. One example of such a prompt was described above by reference to the second stage 504 of FIGS. 5 and 6. After receiving the passcode, the device determines (at 1106) whether the entered passcode is authentic. If not, the device determines (at 1108) whether it should provide another prompt to allow the user to provide the passcode again. In some embodiments, the device only allows a user to try to enter the correct passcode a certain number of times before rejecting the password reset request. Also, in some case, the user might cancel the password-reset operation by selecting a cancel option that is presented in the passcode-reset prompt. Thus, the process ends after 1108 when the user cancels the password reset operation or when the user fails to provide the correct passcode after a certain number of tries. Otherwise, the device prompts (at 1108) the user to provide the passcode again and returns to 1106 to determine whether this passcode is authentic.

When the process determines (at 1106) that the entered passcode is authentic, the device provides (at 1110) a prompt to allow the user to specify the reason for the password reset. One example of this prompt was described above by reference to the third stages 506 and 606 of FIGS. 5 and 6. As mentioned above, when the user specifies that the password reset is because of a lost/inactive device or suspicious account activity, the device provides (at 1110) another prompt that requires the user to identify (1) the devices that should remain as active, and/or (2) the devices that should be made inactive. The device provides this prompt because the device will send to the authentication server set a list of one or more devices that should be inactivated along with a message that the user wants to reset the account password. One example of this prompt was described above by reference to the fourth stage 608 of FIG. 6. On the other hand, when the user specifies that the password reset is because he forgot the password or he wants to refresh the password, the device does not provide a prompt that requires the user to identify the active devices and/or inactive devices.

After 1110, the device decrypts (at 1112) the ARP by using the supplied passcode. The device then provides (at 1114) a prompt that directs the user to provide the new password. In some embodiments, the device requires the user to enter the new password twice to make sure that the new password is entered correctly. Next, at 1116, the device sends to the authentication server set 905 (1) a password-change request, (2) the new password, and (3) the ARP. When the user specifies that the password is being reset because of a lost/inactive device or suspicious account activity, the device also sends (at 1116) a list of devices that should be inactivated.

After receiving (at 1118) the password reset message along with the new password, ARP, and if applicable, the list of devices to inactivate, the authentication server set 905 checks (at 1120) the ARP to make sure it is valid. To check the ARP, the authentication server set 905 compares the received ARP with the ARP that it maintains in its ARP storage 940 for the devices associated with the account. In other embodiments, the authentication server set 905 authenticated the received ARP through other means (e.g., through a authentication computation) for authenticating a parameter. If the received ARP is not valid, the server set 905 rejects (at 1122) the password change request. The device (at 1124) receives this rejection, provides a prompt to the user, and then ends the process.

When the authentication server set 905 determines (at 1120) that the ARP is valid, this server set directs (at 1126) all the service server sets to invalidate all service tokens that they had previously handed out to all of the devices that are associated with the account for which the password change is being requested. If the authentication server set 905 also receives (at 1118) a list of devices to inactivate, the server set also removes or invalidates (at 1128) the ACP of any device on this list from the ACP records that it maintains for the account in its ACP storage 950.

Next, at 1130, the authentication server set provides a confirmation of the password change and a new password token for the device. The device receives (at 1135) the password-change confirmation and the new password token. After the device receives the new password token, the device supplies this new password token to a service server set 910, which then (1) checks it with the authentication server, and (2) once it receives this token's authentication, supplies a new service token to the device. The device then protects and stores this new service token and continues its access to the service(s) offered by the service server set. After 1132, the operations of the device, service server set 910 and the authentication server set 905 are identical to their operations 1018-1034 in FIG. 10, and hence are similarly numbered in FIG. 11B.

In some embodiments, the process 1100 provides multiple password tokens to the device at 1132. This is because at the time of the password reset, the device might have had access to multiple service server sets. Thus, in some embodiments, the authentication server set 905 provides one password token for each service server set that the device is currently accessing. The authentication server set obtains the identity of these service server sets from the device (e.g., at 1118) in some embodiments, while in other embodiments, the authentication server set maintains a list of service server sets for which the authentication server set has previously provided password tokens to the device. In still other embodiments, one password token allows the device to access multiple different service server sets. In yet other embodiments, the authentication server set 905 does not provide any password token as part of the process 1100. Under this approach, the device would have to perform the process 1200 of FIGS. 12A and 12B to obtain a new password token and then a new service token for each service server set that the device wants to access again.

FIGS. 12A and 12B illustrate a process 1200 that uses a service token to give a device access to a service server set. This process 1200 also shows how the ACP can be used to allow a device to stay logged into a service after the account login credential set has been modified without requiring the device to provide the modified login credential set.

As shown, the process 1200 starts when the device provides (at 1202) a service token to a service server set. The device previously received this service token during an initial login into an account or during a previous iteration of the process 1200 when the device received a new service token. If valid, the service token allows the device to gain access to one or more services (e.g., email services, data-storage services, data-synchronization services, etc.) that are provided by the service server set.

The service server set receives (at 1204) the service token sent from the device. It then determines (at 1206) whether the service token is authentic. To make this determination, the service server set in some embodiments determines (at 1206) whether the received service token is on a list of valid service tokens that the service server set maintains in its service token data storage 960. In other embodiments, the service server set authenticated the received service token through other means (e.g., through a computational authentication operation).

When the received service token is valid, the service server set 910 accepts (at 1208) the received service token and grants the device access to the requested service. The device (at 1210) receives this notification and starts to access the service. The process 1200 then ends.

The received service token might be invalid if the service server set previously inactivated it or discarded it at the direction of the authentication server set (e.g., when the password for the associated account was changed). In some embodiments, the service tokens expire after a period of time (e.g., 6 months) or a period of time that they have not been used. Once they expire, the service tokens are deemed to be invalid.

When the service server set determines (at 1206) that the received service token is invalid, the process rejects (at 1212) the received service token. After the device receives (at 1214) this rejection, the device (at 1216) decrypts the ACP and provides the decrypted ACP to the authentication server set 905. Once this server set 905 receives (at 1218) the ACP, it determines (at 1220) whether the ACP is valid. To make this determination, the authentication server set 905 compares the received ACP with the ACPs that it stores in its ACP storage 950, or performs another authenticate operation to try to authenticated the ACP. When the ACP is invalid, the authentication server set 905 rejects (at 1222) the ACP. The device (at 1224) receives this rejection and prompts the user to provide the login credentials for accessing the desired service(s) for the account. After 1224, the process 1200 ends.

On the other hand, when the authentication server set 905 determines (at 1220) that the received ACP is authentic, this server set provides (at 1226) a new password token to the device. After the device receives (at 1228) the new password token, the device supplies (at 1018) this new password token to the service server set 910, which then (1) checks it with the authentication server, and (2) once it receives (1028) this token's authentication, supplies (at 1030) a new service token to the device. The device then (at 1032) protects and stores this new service token and continues (at 1034) its access to the service(s) offered by the service server set. After 1228, the operations of the device, service server set 910 and the authentication server set 905 are identical to their operations 1018-1034 in FIG. 10, and hence are similarly numbered in FIG. 12B.

In other embodiments, the devices, service server sets and authentication server set interact differently than the approach described above by reference to FIGS. 9-12B. For instance, in some embodiments, the devices interact only with the service server sets and it is the job of the service server sets to interact with the authentication server set to authenticate login credentials, ARPs and ACPs provided by the device.

Figure 13:
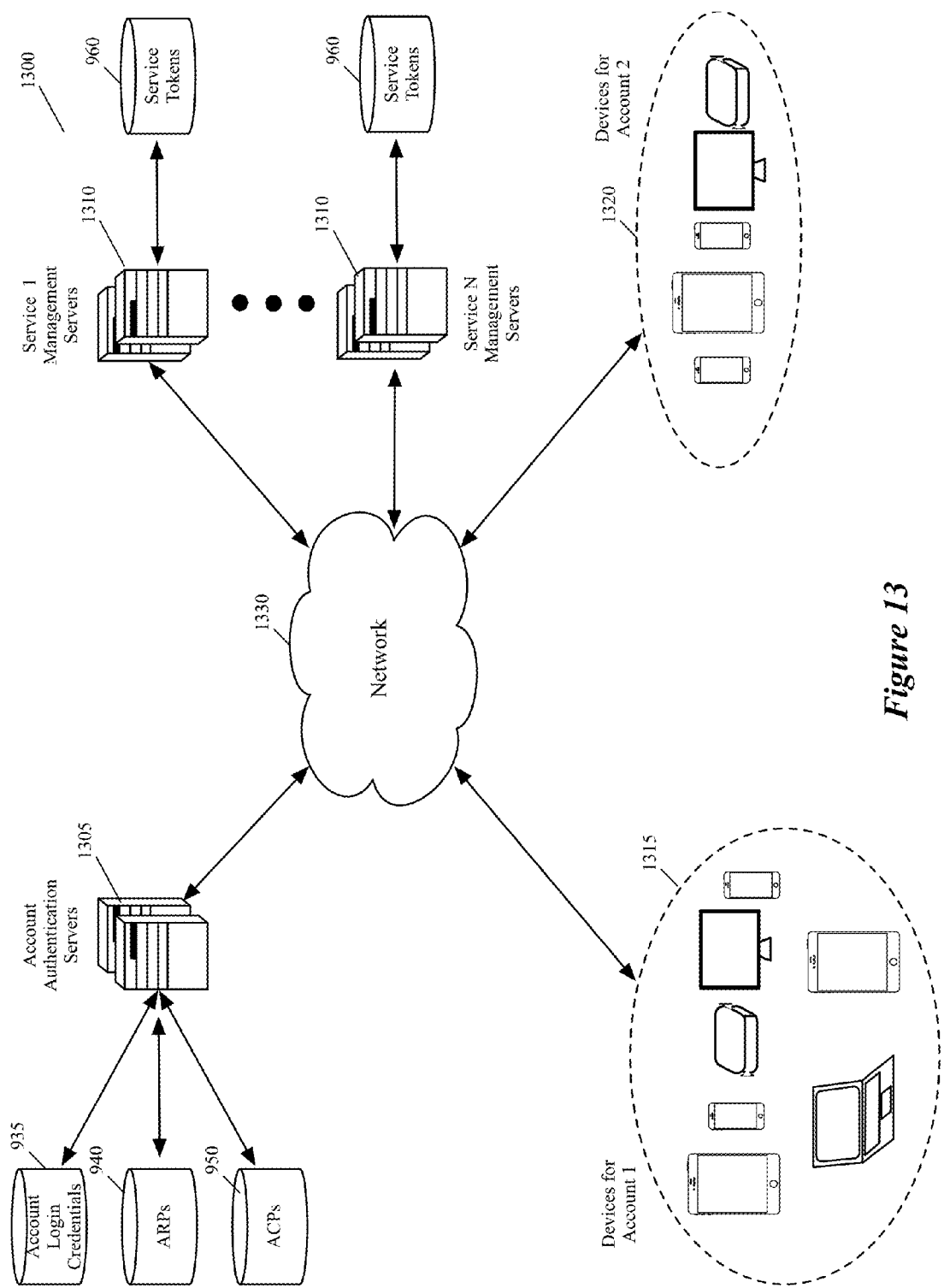
FIG. 13 illustrates another example of a service delivery system of some embodiments.

FIG. 13 illustrates the system architecture of one such approach. Specifically, this figure illustrates a service delivery system 1300 that uses (1) a set of one or more authentication servers 1305 for managing account login credentials, ARPs and ACPs, and (2) several sets of service servers 910 for providing services to devices that after they have been authenticated through login credentials or ACPs. As shown, the devices and the server sets are communicatively coupled through a network 1330 (such as the Internet).

As further shown, the authentication server set 1305 uses three data storages 1335, 1340 and 1350 to respectively store the account-login credentials, the ARPs, and the ACPs, while the service server sets 1310 use the data storages 960 to store the service tokens that are handed out to authenticated devices. FIG. 13 also shows two sets of devices 1315 and 1320 that are associated with two different accounts. Examples of such devices include smartphones, tablets, desktop computers, laptop computers, streaming media players (e.g., AppleTV, etc.), etc. For each account, each device can access multiple services that are provided by multiple different sets of service servers 1310 after the device logs into the account. Examples of such services include email services, photo-sharing services, content-sharing services, etc.

To log into an account, each device obtains from a user the account login credentials (e.g., username, password, second factor authentication parameter, etc.) and forwards them to the service server set 1310, which then relays the login credentials to authentication server set 1305. This server set 1305 then authenticates the login credentials and informs the service server set 1310 of this authentication. The service server set then provides a service token to the device so that the device can use this token for subsequent accesses to the service server set.

In addition to authenticating the login credentials, the authentication server set 1305 also provides an ACP to the service server set 1310, which it relays to the device. The device can later use the ACP to stay logged into a service, as described above and further described below. In addition to the ACP, the authentication server set can also provide an ARP to the service server set to pass along to the device. For example, in some embodiments, the device informs the service server set that access to the device is restricted by a passcode or gesture that meets a threshold criteria, and the service server set passes this information along to the authentication server set 1305. Because the device access is so restricted, the authentication then provides the ARP to service server set 1310, which then relays the ARP to the device.

The device can then subsequently use the ARP to modify the account credential set. To subsequently use either the ARP or the ACP, the device would submit the ARP or ACP to the service server set, which then relays the ARP or ACP to the authentication server set to authenticate.

When logging into the user account of some embodiments (the process which verifies the user credentials and allows the user to receive an ACP and/or ARP), some embodiments require a new device or a device requesting access to an account to provide a second authentication factor in addition to the user credential (e.g., the user password) to become a trusted device. Specifically, in some embodiments the set of verification servers generates a random or pseudo-random code and sends this to a previously trusted user device, or has the previously trusted user device generate such a code. The user must then enter this code on the new device in order to verify that she is in possession of a valid, existing device. Some embodiments require the trusted user device to have an ARP (e.g., to have a device passcode), while other embodiments do not impose such a requirement.

Different embodiments may use different techniques to provide the code that the user is required to enter on the new device. For instance, some embodiments use a numeric or alphanumeric code that is sent via a short message service (SMS) message (i.e., a text message) to the trusted device of the user, which the user must then enter through a dialog box on the new device. Some embodiments use a phone call to provide a similar alphanumeric code. Some embodiments use a Quick Response (QR) code, or similar visual code, and require the user to use the new device to photograph the visual code displayed on the trusted device.

In some embodiments, a user may request from a client application on a "requesting device" to receive a code from a trusted device. The client application on the trusted device may prompt the user to accept the request for the code from the requesting device. In some embodiments, a map with the location of the requesting device and a description of the requesting device may be displayed on the user interface of the trusted device along with the request. Upon receipt of input indicating acceptance of the request at the trusted device, the trusted device (now an "accepting device") may generate the code and display the code on the accepting device for entry by the user into a prompt on the user interface of the requesting device. The code may be a random or pseudo-random number generated by using a seed that is tied to the trusted device (e.g., a machine identifier). In some embodiments, the seed may be provisioned with the operating system. In some embodiments, this generated code is reproducible by the verification servers, in order to verify that the code entered at the requesting device is correct. In other embodiments, the verification server may receive the seed data or the generated code from the accepting device and subsequently receive the generated code from the requesting device to verify the code entered at the requesting device is correct.

Irrespective of the type of code used, the new device sends the code to the server (or proof of the code, such as a hash generated from the code). Only when the server has verified the first credential and the code (functioning as a second factor for authentication) do the verification servers allow the new device to access the account (and be provided with an ACP and/or ARP).

In some embodiments, the devices, in addition to joining an account with the centralized servers, also join a synchronization circle, enabling the devices to securely share data with each other (without the centralized entity that verifies the user account having the ability to access the data). This process, in some embodiments, also requires that the user verify on an established device that the new device should be joining the synchronization circle. Some embodiments combine the two processes (joining the circle and joining the account with the centralized entity) in a single process.

In this single process, the requesting device initially sends a message to the previously verified device, in order to start the unified circle and account joining process. The accepting device then generates a random or pseudo-random code, in any manner similar to those described in the above paragraphs. However, this code is not known to or reproducible by the centralized entity. Again, the user is required to provide this code to the new device, with the manner of provision depending on the type of code. The verified device sends a message to the device requesting proof of this code, which the new device then provides, along with its identity for joining the synchronization circle. To keep this secure, some embodiments encrypt the proof using a key generated, at least in part, from the account password, as well as other cryptographic factors. At this point, the new device is able to join the synchronization circle. To automatically enable access to the account with the centralized entity, the verified device sends, via the secure connection, another random code to the new device. This random code, like those described above, is known to or reproducible by the verification servers (and, as described, may be sent by the verification servers to the previously verified device, or generated on the previously verified device). The new device can send this second code to the verification servers to provide its second authentication factor, and be verified for access to the user account (and thus receive an ACP and/or ARP. This single process is described in greater detail in concurrently filed U.S. patent application Ser. No. 14/871782, and entitled "Combined Authorization Process", which is incorporated herein by reference.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
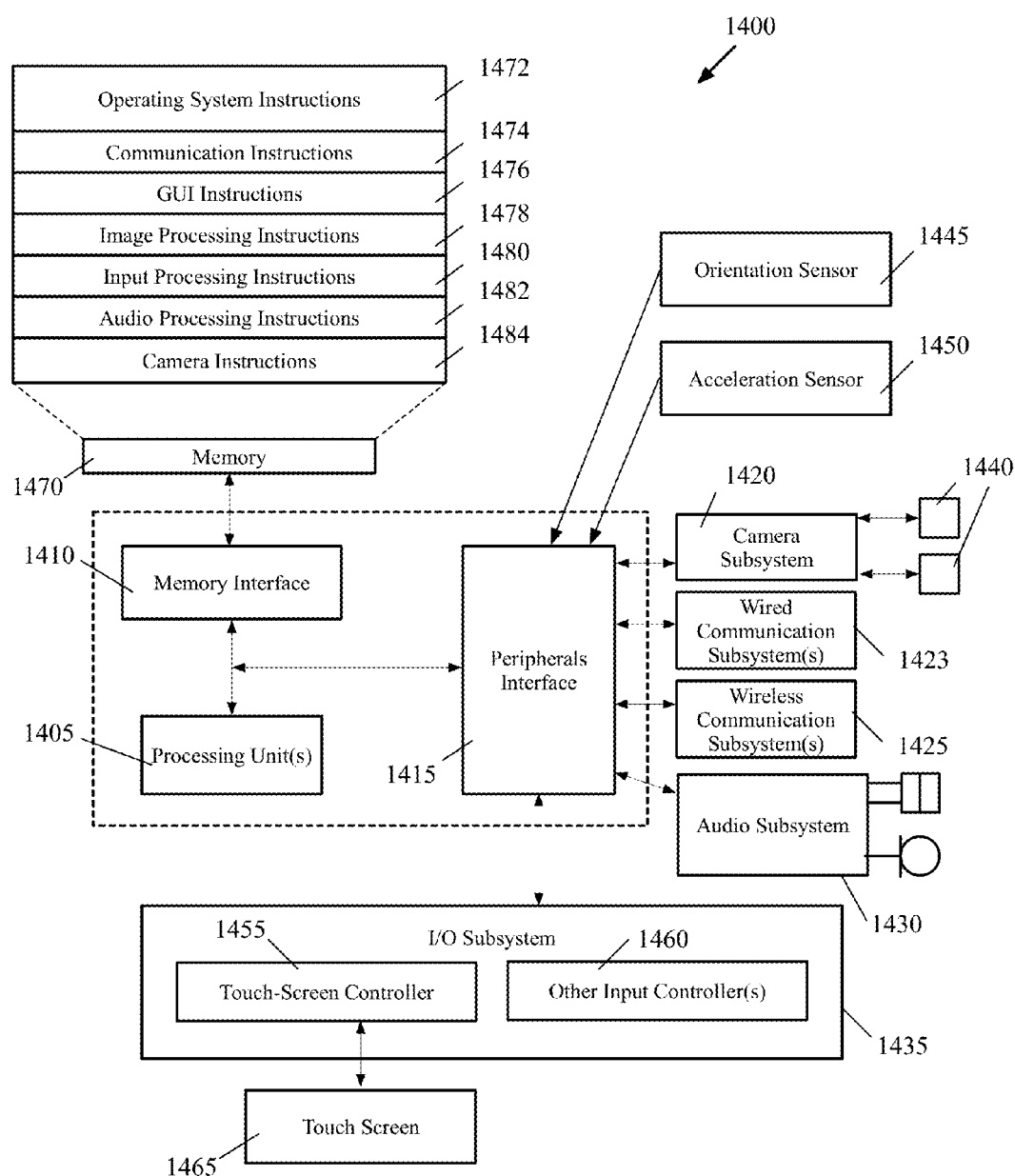
FIG. 14 is an example of an architecture of a mobile computing device.

The applications of some embodiments operate on mobile devices, such as smart phones (e.g., iPhones®) and tablets (e.g., iPads®). FIG. 14 is an example of an architecture 1400 of such a mobile computing device. Examples of mobile computing devices include smartphones, tablets, laptops, etc. As shown, the mobile computing device 1400 includes one or more processing units 1405, a memory interface 1410 and a peripherals interface 1415.

The peripherals interface 1415 is coupled to various sensors and subsystems, including a camera subsystem 1420, a wireless communication subsystem(s) 1425, an audio subsystem 1430, an I/O subsystem 1435, etc. The peripherals interface 1415 enables communication between the processing units 1405 and various peripherals. For example, an orientation sensor 1445 (e.g., a gyroscope) and an acceleration sensor 1450 (e.g., an accelerometer) is coupled to the peripherals interface 1415 to facilitate orientation and acceleration functions.

The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 coupled with the optical sensors 1440 facilitates camera functions, such as image and/or video data capturing. The wireless communication subsystem 1425 serves to facilitate communication functions. In some embodiments, the wireless communication subsystem 1425 includes radio frequency receivers and transmitters, and optical receivers and transmitters (not shown in FIG. 14). These receivers and transmitters of some embodiments are implemented to operate over one or more communication networks such as a GSM network, a Wi-Fi network, a Bluetooth network, etc. The audio subsystem 1430 is coupled to a speaker to output audio (e.g., to output voice navigation instructions). Additionally, the audio subsystem 1430 is coupled to a microphone to facilitate voice-enabled functions, such as voice recognition (e.g., for searching), digital recording, etc.

The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455 and other input controllers 1460 to facilitate the transfer between input/output peripheral devices and the data bus of the processing units 1405. As shown, the touch-screen controller 1455 is coupled to a touch screen 1465. The touch-screen controller 1455 detects contact and movement on the touch screen 1465 using any of multiple touch sensitivity technologies. The other input controllers 1460 are coupled to other input/control devices, such as one or more buttons. Some embodiments include a near-touch sensitive screen and a corresponding controller that can detect near-touch interactions instead of or in addition to touch interactions.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1472. The OS 1472 includes instructions for handling basic system services and for performing hardware dependent tasks.

The memory 1470 also includes communication instructions 1474 to facilitate communicating with one or more additional devices; graphical user interface instructions 1476 to facilitate graphic user interface processing; image processing instructions 1478 to facilitate image-related processing and functions; input processing instructions 1480 to facilitate input-related (e.g., touch input) processes and functions; audio processing instructions 1482 to facilitate audio-related processes and functions; and camera instructions 1484 to facilitate camera-related processes and functions. The instructions described above are merely exemplary and the memory 1470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

Figure 15:
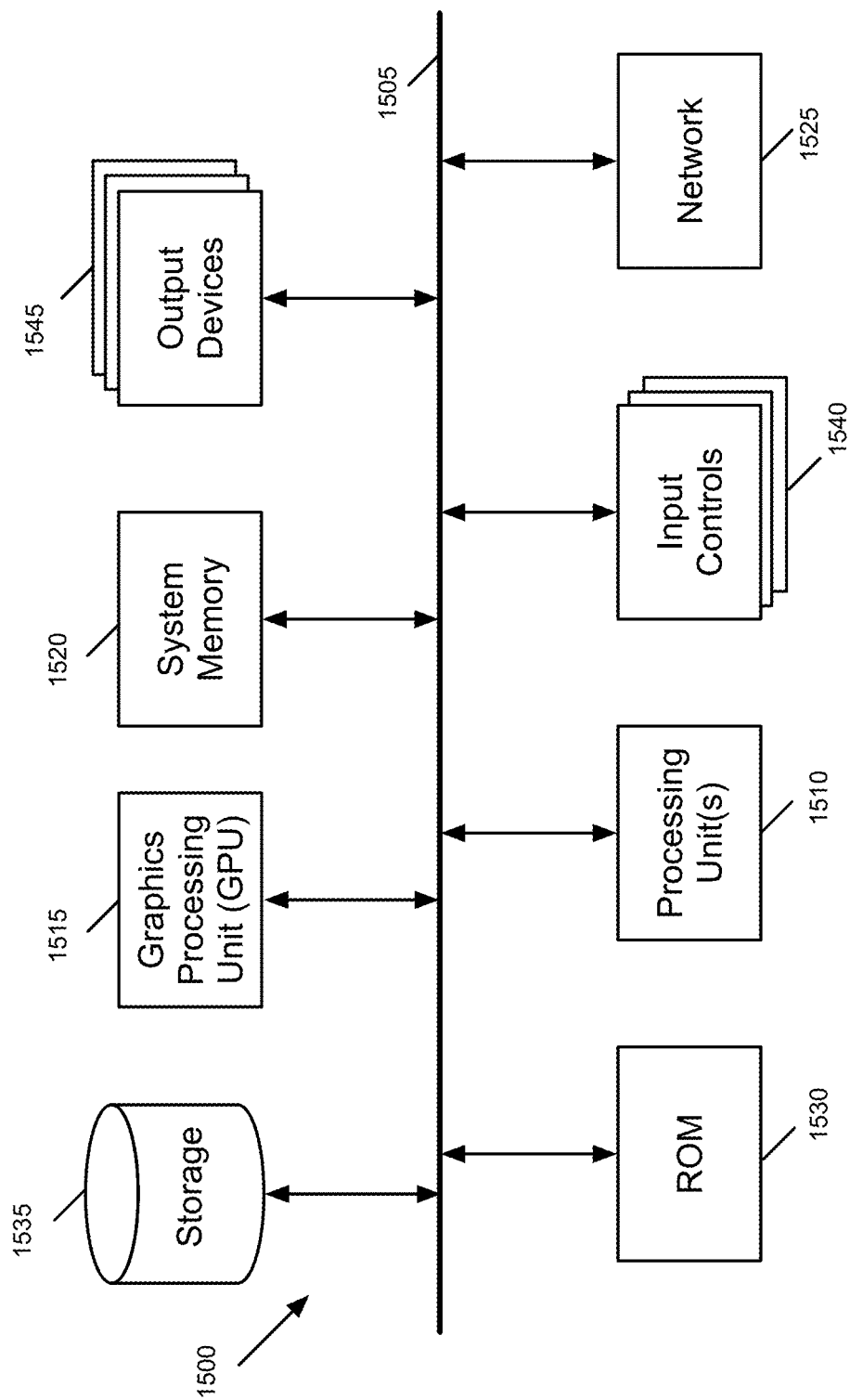
FIG. 15 conceptually illustrates another example of an electronic system with which some embodiments of the invention are implemented.

FIG. 15 conceptually illustrates another example of an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive, integrated flash memory) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alpha-numeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet), or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, the account access recovery processes of some embodiments were described above by reference to account credential-reset operations (e.g., password reset operations). However, one of ordinary skill will realize that the account recovery processes of some embodiments can be used to gain access to an account through other mechanisms. For instance, in some embodiments, an account is locked after multiple failed login attempts. For such circumstances, some embodiments allow a device to use its ARP (e.g., after a user provides his passcode or other device access control) to unlock the account.

Several of the above-described examples refer to recovering access to an account in order to obtain services from one or more servers. In other embodiments, the account access recovery allows a user to gain access to services provided by the device itself. One of ordinary skill in the art would understand that the invention is not to be limited by the foregoing illustrative details, but rather is to be defined by the appended claims.

We claim:

1. A non-transitory machine readable medium storing a program, which when executed by at least one processing unit recovers access to an account, the program comprising sets of instructions for:
   receiving an access recovery parameter (ARP) after providing a first credential to log into an account and providing a notification of a second credential necessary for accessing another resource;
   receiving a request to modify the first credential;
   receiving the second credential; and
   after authenticating the second credential, using the ARP to modify the first credential without providing the first credential.

2. The non-transitory machine readable medium of claim 1, wherein the program further comprises a set of instructions for storing the ARP after receiving ARP.

3. The non-transitory machine readable medium of claim 2, wherein the program further comprises a set of instructions for encrypting the ARP before storing the ARP.

4. The non-transitory machine readable medium of claim 2, wherein the program further comprises a set of instructions for using the second credential as a key for encrypting the ARP before storing the ARP.

5. The non-transitory machine readable medium of claim 2,
   wherein the non-transitory machine readable medium is a machine readable medium of a device,
   wherein the set of instructions for storing the ARP comprises a set of instructions for storing the ARP on the device.

6. The non-transitory machine readable medium of claim 1, wherein the set of instructions for providing the first credential comprises a set of instructions for completing a login process, said login process comprising providing an account password and providing a second factor authentication parameter.

7. The non-transitory machine readable medium of claim 6, wherein the first credential is the account password.

8. The non-transitory machine readable medium of claim 1,
   wherein the non-transitory machine readable medium is a machine readable medium of a device,
   wherein the other resource is the device,
   wherein the second credential is an access control parameter for accessing the device.

9. The non-transitory machine readable medium of claim 8, wherein the access control parameter is a passcode needed to unlock the device after a display screen of the device has been placed in a locked mode.

10. The non-transitory machine readable medium of claim 8, wherein the access control parameter is a gesture control needed to unlock the device after a display screen of the device has been placed in a locked mode.

11. The non-transitory machine readable medium of claim 1, wherein the set of instructions for using the ARP comprises sets of instructions for:
    providing the ARP and a new value for the first credential to a set of one or more authentication servers for authenticating the ARP; and
    changing the first credential from a previous value to a new value after authenticating the ARP.

12. A method for recovering access to an account on a device, the method comprising:
    receiving an access recovery parameter (ARP) after providing a first credential to log into an account and providing a notification of a second credential necessary for accessing another resource;
    receiving a request to modify the first credential;
    receiving the second credential; and
    after authenticating the second credential, using the ARP to modify the first credential without providing the first credential.

13. The method of claim 12 further comprising storing the ARP after receiving ARP.

14. The method of claim 13 further comprising encrypting the ARP before storing the ARP.

15. The method of claim 13 further comprising using the second credential as a key for encrypting the ARP before storing the ARP.

16. The method of claim 13, wherein storing the ARP comprises storing the ARP on the device.

17. The method of claim 12, wherein providing the first credential comprises completing a login process, said login process comprising providing an account password and providing a second factor authentication parameter.

18. The method of claim 12,
    wherein the other resource is the device associated with the account,
    wherein the second credential is a device access control parameter for accessing the device.

19. The method of claim 18, wherein the access control parameter is a passcode needed to unlock the device after a display screen of the device has been placed in a locked mode.

20. The method of claim 18, wherein the access control parameter is a gesture control needed to unlock the device after a display screen of the device has been placed in a locked mode.

* * * * *